US012545026B2

(12) United States Patent
Aoyama

(10) Patent No.: US 12,545,026 B2
(45) Date of Patent: Feb. 10, 2026

(54) ACTUATOR, LIQUID DISCHARGE HEAD, LIQUID DISCHARGE APPARATUS, AND METHOD OF MANUFACTURING ACTUATOR

(71) Applicant: Tsutoh Aoyama, Kanagawa (JP)

(72) Inventor: Tsutoh Aoyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 149 days.

(21) Appl. No.: 18/487,375

(22) Filed: Oct. 16, 2023

(65) Prior Publication Data

US 2024/0140095 A1 May 2, 2024

(30) Foreign Application Priority Data

Oct. 31, 2022 (JP) ................................ 2022-174714
Jun. 23, 2023 (JP) ................................ 2023-103600

(51) Int. Cl.
*B41J 2/14* (2006.01)
*B41J 2/16* (2006.01)

(52) U.S. Cl.
CPC ....... *B41J 2/14298* (2013.01); *B41J 2/14201* (2013.01); *B41J 2/14233* (2013.01); *B41J 2/14274* (2013.01); *B41J 2002/14241* (2013.01); *B41J 2002/14266* (2013.01); *B41J 2/161* (2013.01)

(58) Field of Classification Search
CPC ................ B41J 2/14298; B41J 2/14201; B41J 2/14233; B41J 2/14274; B41J 2002/14241; B41J 2002/14266
See application file for complete search history.

(56) References Cited

U.S. PATENT DOCUMENTS

| | | | | |
|---|---|---|---|---|
| 4,443,807 | A * | 4/1984 | Koto | B41J 2/04541 347/70 |
| 2010/0231659 | A1* | 9/2010 | Ohta | B41J 2/14233 310/366 |
| 2015/0022592 | A1 | 1/2015 | Aoyama et al. | |
| 2015/0070444 | A1 | 3/2015 | Ishimori et al. | |
| 2019/0270310 | A1 | 9/2019 | Masuda et al. | |
| 2023/0037253 | A1 | 2/2023 | Aoyama | |

FOREIGN PATENT DOCUMENTS

| | | | |
|---|---|---|---|
| JP | H07-148921 | A | 6/1995 |
| JP | 2008-149648 | A | 7/2008 |
| JP | 2008-155461 | A | 7/2008 |
| JP | 2013-208900 | A | 10/2013 |
| JP | 2014-177061 | A | 9/2014 |
| WO | WO2018/054917 | A1 | 3/2018 |

* cited by examiner

*Primary Examiner* — Geoffrey S Mruk
(74) *Attorney, Agent, or Firm* — IPUSA, PLLC

(57) ABSTRACT

An actuator includes a substrate, a vibration film, and a piezoelectric element. The substrate has a void space having a first width, defined by opposed inner walls, in a width direction. The vibration film is disposed over the substrate in a lamination direction perpendicular to the width direction. The vibration film serves as a part of a wall of the void space. The piezoelectric element is disposed over the vibration film in the lamination direction. The piezoelectric element is opposed to the void space of the substrate via the vibration film. The piezoelectric element has a second width smaller than the first width in the width direction. The piezoelectric element has outer ends, defining the second width, within the opposed inner walls of the void space in the width direction.

11 Claims, 39 Drawing Sheets

ACTUATOR, LIQUID DISCHARGE HEAD, LIQUID DISCHARGE APPARATUS, AND METHOD OF MANUFACTURING ACTUATOR

CROSS-REFERENCE TO RELATED APPLICATIONS

This patent application is based on and claims priority pursuant to 35 U.S.C. § 119(a) to Japanese Patent Application Nos. 2022-174714, filed on Oct. 31, 2022, and 2023-103600, filed on Jun. 23, 2023, in the Japan Patent Office, the entire disclosure of each of which is hereby incorporated by reference herein.

BACKGROUND

Technical Field

Embodiments of the present disclosure relate to an actuator, a liquid discharge head, a liquid discharge apparatus, and a method of manufacturing the actuator.

Related Art

In the related art, a liquid discharge head includes an actuator. In the actuator, a piezoelectric body is disposed inside a peripheral wall of a pressure chamber, a lower electrode is individually provided for each piezoelectric body, and one end of the lower electrode in a longitudinal direction overlaps the peripheral wall of the pressure chamber.

SUMMARY

Embodiments of the present disclosure describe an improved actuator that includes a substrate, a vibration film, and a piezoelectric element. The substrate has a void space having a first width, defined by opposed inner walls, in a width direction. The vibration film is disposed over the substrate in a lamination direction perpendicular to the width direction. The vibration film serves as a part of a wall of the void space. The piezoelectric element is disposed over the vibration film in the lamination direction. The piezoelectric element is opposed to the void space of the substrate via the vibration film. The piezoelectric element has a second width smaller than the first width in the width direction. The piezoelectric element has outer ends, defining the second width, within the opposed inner walls of the void space in the width direction.

According to other embodiments of the present disclosure, there is provided a method of manufacturing an actuator. The method includes forming a vibration film over a substrate in a lamination direction, forming a first electrode of a piezoelectric element over the vibration film in the lamination direction, forming a piezoelectric film of the piezoelectric element over the first electrode in the lamination direction, forming a second electrode of the piezoelectric element over the piezoelectric film in the lamination direction, and forming a void space in the substrate. The first electrode has a first width in a width direction perpendicular to the lamination direction. The void space has a second width larger than the first width in the width direction.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
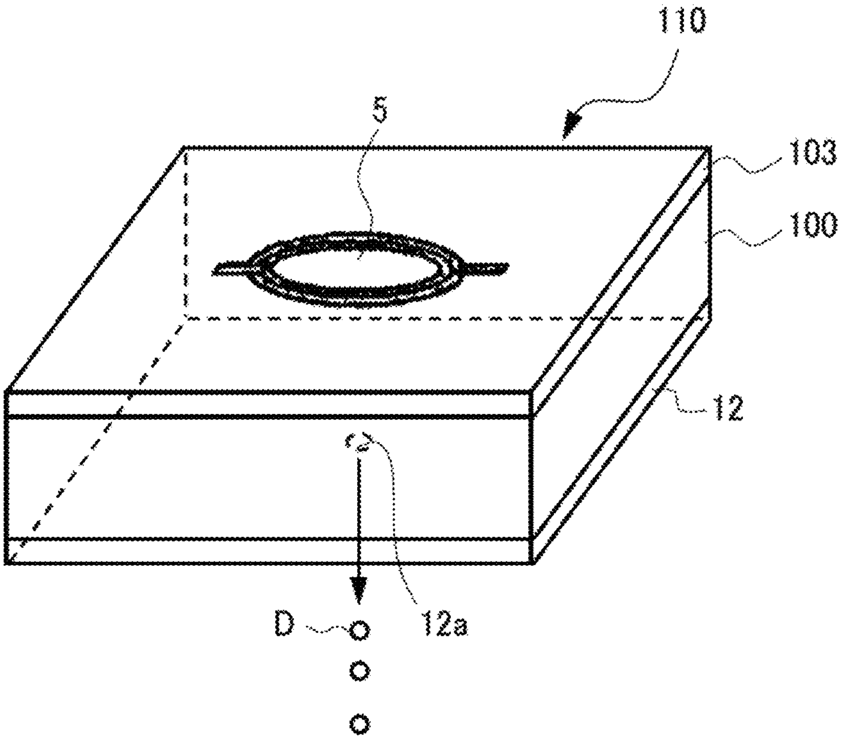
FIG. 1 is a schematic perspective view of an actuator according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described below with reference to the drawings. In the description of the drawings, like reference signs denote like elements, and overlapping description may be simplified or omitted as appropriate. A liquid discharge head of a liquid discharge apparatus according to embodiments of the present disclosure is described below, but the present disclosure is not intended to be limited to the embodiments described below. Any deletion, addition, modification, or change can be made without departing from the scope of the present disclosure in which a person skilled in the art can conceive other embodiments, any of which is included within the scope of the present disclosure as long as the effect and feature of the present disclosure are demonstrated.

First Embodiment

Configuration of Actuator

Figure 2:
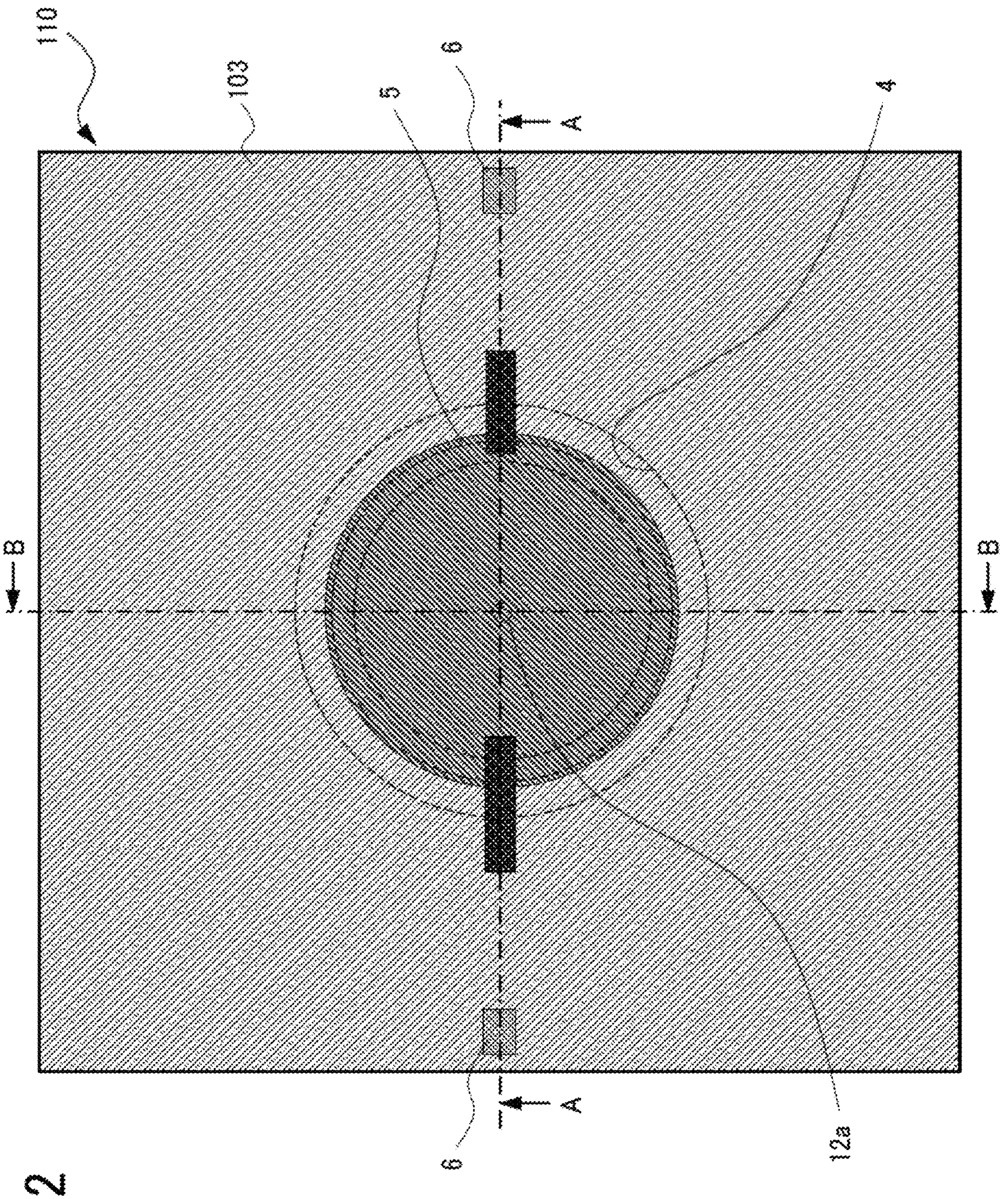
FIG. 2 is a plan view of the actuator in FIG. 1, illustrating relative positions between a piezoelectric element and a liquid chamber of the actuator.

A schematic configuration of an actuator according to a first embodiment is described below with reference to FIGS. 1 and 2. FIG. 1 is a schematic perspective view of an actuator 110 according to the present embodiment. FIG. 2 is a plan view of the actuator 110, illustrating relative positions between a piezoelectric element 5 and a liquid chamber 4 of the actuator 110.

The actuator 110 is, for example, used in a liquid discharge head that discharges a liquid in the liquid chamber 4 from a nozzle 12*a*. In the liquid discharge head, the actuator 110 vibrates a face opposed to a face in which the nozzle 12*a* is disposed (i.e., a nozzle face) among wall faces defining the liquid chamber 4 to discharge the liquid.

The actuator 110 has a thin film shape and includes a channel substrate 100, a vibration film 103, and the annular (or circular) piezoelectric element 5 over the vibration film 103 in a lamination direction. When the actuator 110 is used in the liquid discharge head, for example, the liquid discharge head includes a nozzle plate 12 over the channel substrate 100 of the actuator 110. As illustrated in FIG. 2, the channel substrate 100 defines the liquid chamber 4 opposed to the piezoelectric element 5 therein. The liquid chamber 4 is a void space according to the present embodiment. The nozzle plate 12 has the nozzle 12*a* which is an opening hole, and the nozzle 12*a* communicates with the liquid chamber 4. The actuator 110 includes electrical connection pads 6 to be connected to an electrical component, such as an external power supply, at both ends thereof.

In the actuator 110 having the above-described configuration, the piezoelectric element 5 vibrates a wall of the liquid chamber 4 opposed to the nozzle face to discharge the liquid in the liquid chamber 4 from the nozzle 12*a* as a droplet D.

Figure 3A:
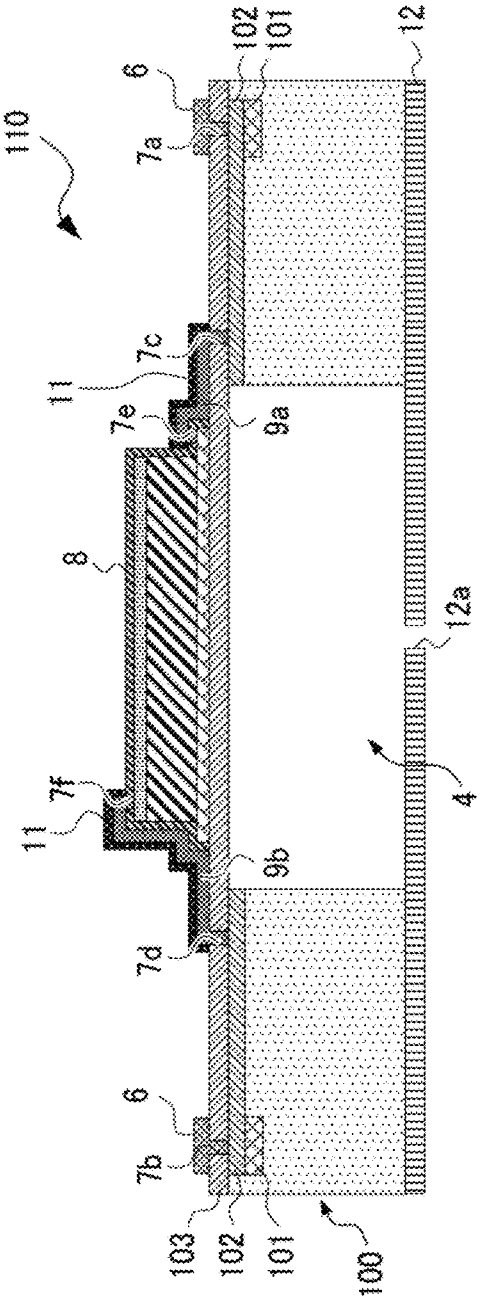
FIGS. 3A and 3B are cross-sectional views of the actuator taken along line A-A or line B-B in FIG. 2.
Figure 3B:
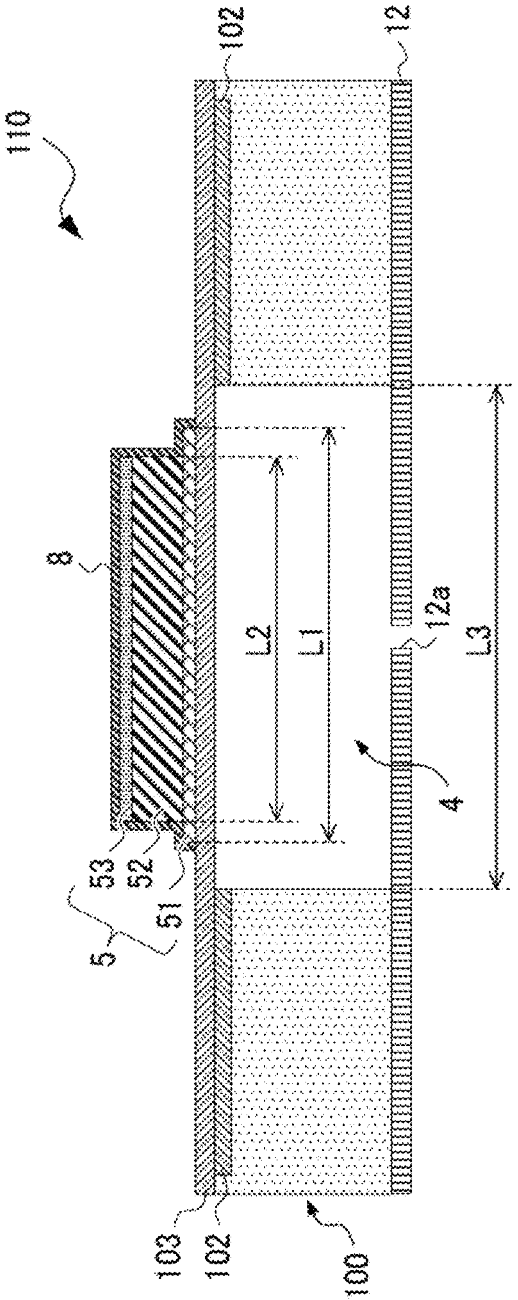

The internal structure of the actuator 110 is described below with reference to FIGS. 3A and 3B. FIG. 3A is a cross-sectional view of the actuator 110 taken along line A-A in FIG. 2. FIG. 3B is a cross-sectional view of the actuator 110 taken along line B-B in FIG. 2.

In FIGS. 3A and 3B, the channel substrate 100 as a substrate according to the present embodiment is a silicon on insulator (SOI) substrate. The channel substrate 100 includes a drive circuit 101 and a wiring 102 on a side on which the vibration film 103 is formed. The drive circuit 101 includes, for example, a transistor and a resistor. The wiring 102 includes a wiring for applying a voltage to a first electrode 51 and a wiring for applying a voltage to a second electrode 53. The wiring 102 is electrically connected to electrical connection pads 6 through hole-shaped first contact 7*a* and second contact 7*b* opened in the vibration film 103.

The nozzle plate 12 and the vibration film 103 are disposed on opposite sides of the channel substrate 100. The nozzle plate 12 may have a liquid-repellent film (water-repellent film) on the nozzle face. The liquid-repellent film on the nozzle face prevents liquid from adhering to the nozzle face. Due to such a configuration, liquid can be discharged from the nozzle 12*a* without being affected by the liquid adhering to the nozzle face. When the solvent of the liquid is aqueous, perfluorodecyltrichlorosilane or perfluorooctyltrichlorosilane can be used as the material of the liquid-repellent film.

The piezoelectric element 5 of the actuator 110 includes the first electrode 51, a piezoelectric film 52, and the second electrode 53. The first electrode 51 may be referred to as a lower electrode, and the second electrode 53 may be referred to as an upper electrode. The piezoelectric element 5 is laminated over one side of the vibration film 103. The other side of the vibration film 106 serves as a part of the wall of the liquid chamber 4. The piezoelectric element 5 is covered with an insulating film 8.

The insulating film 8 has a hole-shaped fifth contact 7*e* through which the first electrode 51 and a first lead 9*a* are electrically connected, and a hole-shaped sixth contact 7*f* through which the second electrode 53 and a second lead 9*b* are electrically connected. The first lead 9*a* is disposed over the insulating film 8 to electrically connect the first electrode 51 and the wiring 102 of the channel substrate 100. The second lead 9*b* is disposed over the insulating film 8 to electrically connect the second electrode 53 and the wiring 102.

One end of the first lead 9*a* is electrically connected to the first electrode 51 through the fifth contact 7*e* of the insulating film 8, and the other end of the first lead 9*a* is electrically connected to the wiring 102 through a third contact 7*c* of the vibration film 103. One end of the second lead 9*b* is electrically connected to the second electrode 53 through the sixth contact 7*f* of the insulating film 8, and the other end of the second lead 9*b* is electrically connected to the wiring 102 through a fourth contact 7*d* of the vibration film 103.

The first lead 9*a* and the second lead 9*b* are covered with a moisture-proof film 11. The moisture-proof film 11 prevents moisture from entering the first lead 9*a* and the second lead 9*b* to prevent corrosion of each of the first lead 9*a* and the second lead 9*b*.

The moisture-proof film 11 is preferably made of a material having an electrical insulation property. For example, silicon nitride (SiN), which is common in a moisture-proof film for a semiconductor, is preferable so that the moisture-proof film 11 can have two functions of the electrical insulation and moisture-proof properties. In addition to SiN, examples of the material of the moisture-proof film 11 include oxides of aluminum (Al), tantalum (Ta), niobium (Nb), titanium (Ti), hafnium (Hf), zirconium (Zr), and tungsten (W), which can be easily formed in a dense film by atomic layer deposition (ALD). Since the moisture-proof film 11 has two functions of the electrical insulation and moisture-proof properties, the actuator 110 can be thinned compared to when an insulating film is separately formed under the moisture-proof film 11. Such a configuration facilitates deformation of the vibration film 103, and enhances vibration efficiency.

The first electrode 51 and the second electrode 53 of the piezoelectric element 5 are made of a metal having high corrosion resistance such as iridium (Ir) or molybdenum (Mo). As a result, the first electrode 51 and the second electrode 53 are hardly corroded by moisture in the surrounding environment.

With the above-described configuration, in the actuator 110, as a predetermined drive waveform (voltage) is applied to the first electrode 51 and the second electrode 53 of the piezoelectric element 5, the piezoelectric film 52 vibrates, and the vibration film 103 vibrates in the vertical direction in FIGS. 3A and 3B. As the vibration film 103 vibrates, the pressure of the liquid in the liquid chamber 4 is changed, and the liquid is discharged from the nozzle 12*a*.

As illustrated in FIG. 3B, when the first electrode 51 has a width L1 (outer diameter), the liquid chamber 4 has a width L3 (outer diameter) larger than the width L1 of the first electrode 51 (i.e., L1<L3). In other words, the first electrode 51 has an outer shape that fits within an outer shape of the liquid chamber 4 in a width direction perpendicular to the lamination direction. The width direction includes any direction perpendicular to the lamination direction, for example, the direction along line A-A in FIG. 2, the direction along line B-B in FIG. 2, and other directions on the same plane. Each of the piezoelectric film 52 and the second electrode 53 has a width L2 (outer diameter) smaller than the width L1 of the first electrode 51 (i.e., L1>L2). In other embodiments, the first electrode 51 may have an outer shape equal to the outer shape (e.g., the width L2) of the piezoelectric film 52 and the second electrode 53.

Deformation of Vibration Film

Figure 4:
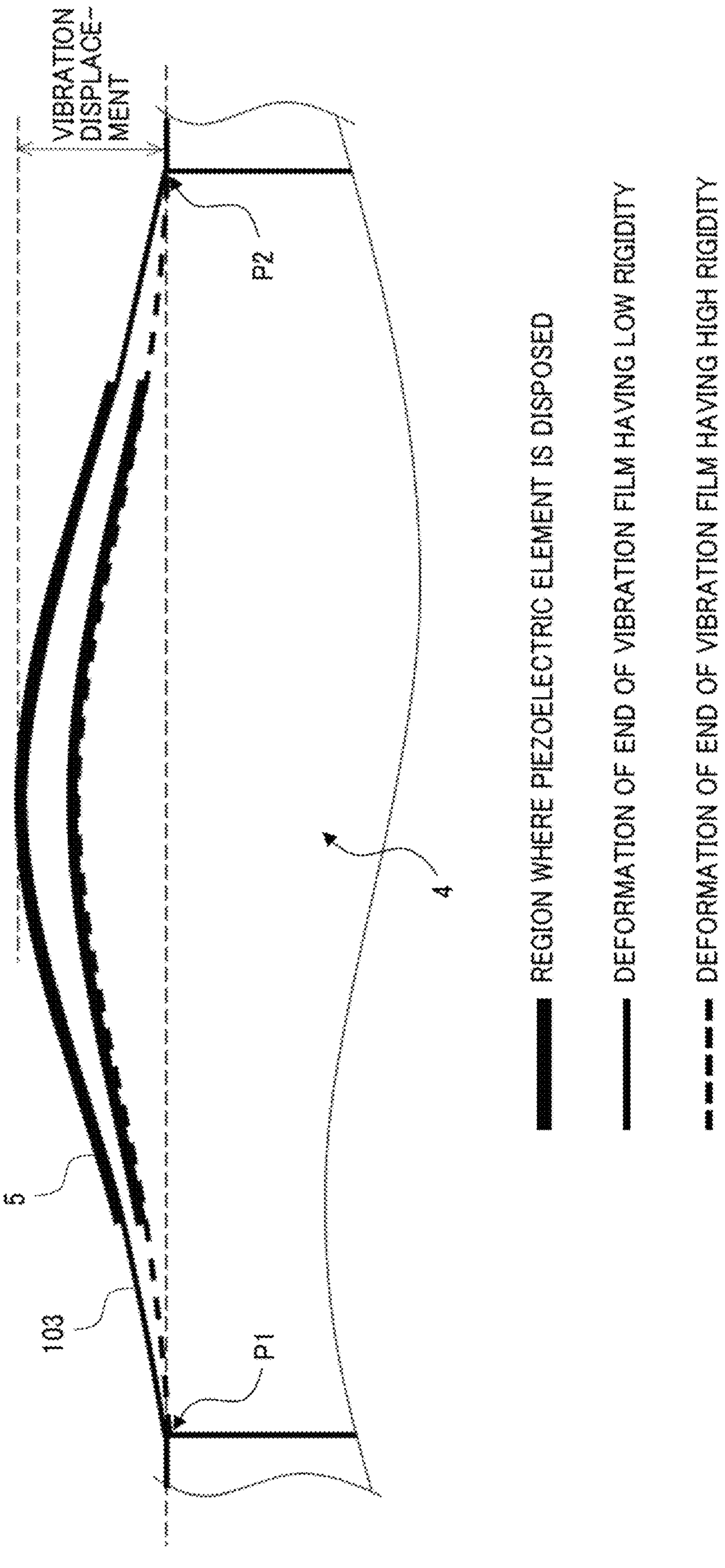
FIG. 4 is a diagram illustrating deformation of a vibration film of the actuator in FIG. 1.

FIG. 4 is a diagram illustrating deformation of the vibration film 103. In the actuator 110, the vibration film 103 is fixed to edges of the liquid chamber 4 (i.e., fixed ends P1 and P2). The vibration film 103 serves as a part of the wall of the liquid chamber 4. The piezoelectric element 5 is supported by a region of the vibration film 103 floating between the fixed ends P1 and end P2. This region may be referred to as a membrane region. Accordingly, when the piezoelectric film 52 vibrates, the vibration film 103 deforms not only in the region where the piezoelectric element 5 is disposed, which is indicated by thick solid lines in FIG. 4, but also in the membrane region with the fixed ends P1 and P2 as inflection points.

With the above-described configuration, when the vibration film 103 has high rigidity, a vibration displacement of the vibration film 103 is large as indicated by the broken line in FIG. 4, and deformation efficiency of the vibration film 103 with respect to voltage may deteriorate. In the actuator 110 according to the present embodiment, the first electrode 51 and the liquid chamber 4 have a width relation described above, and an electrode film and a protective film are not formed in the regions between the region where the piezoelectric element 5 is disposed and the fixed ends P1 and P2 as much as possible. Accordingly, portions of the vibration film 103 near the fixed ends P1 and P2 are easily movable, and the vibration displacement can be increased as indicated by the solid line in FIG. 4. As a result, the vibration film 103 can be sufficiently vibrated. Further, the deformation efficiency of the vibration film 103 with respect to voltage increases, and the voltage for discharging the liquid can be lowered.

Manufacturing Method

A method of manufacturing the actuator is described below with reference to FIGS. 5A to 15B. FIGS. 5A to 11B and FIGS. 13A to 15B are cross-sectional views of the actuator 110 during a manufacturing process of the actuator 110 according to the present embodiment, in which a suffix A indicates a cross section taken along line A-A in FIG. 2 and a suffix B indicates a cross section taken along line B-B in FIG. 2.

Figure 5A:
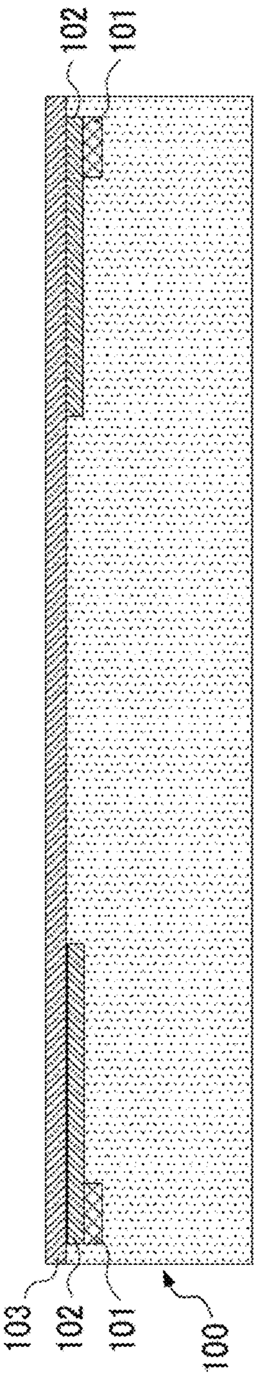
FIGS. 5A and 5B are diagrams each illustrating processes of forming a drive circuit, a wiring, and the vibration film over a channel substrate of the actuator in FIG. 1.
Figure 5B:
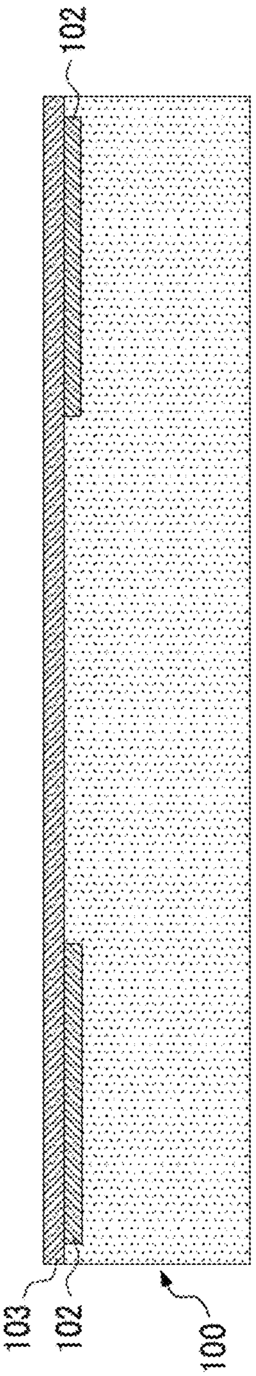

As illustrated in FIGS. 5A and 5B, the drive circuit 101 including a transistor and a resistor and the wiring 102 are formed over a silicon film of the channel substrate 100 as the SOI substrate. When the drive circuit 101 is not incorporated in the channel substrate 100, a silicon (Si) substrate may be used as the channel substrate 100.

Then, the vibration film 103 is formed over one side of the channel substrate 100 on which the drive circuit 101 and the wiring 102 are formed. The vibration film 103 may be made of a material having at least the electrical insulation property, such as silicon dioxide ($SiO_2$), SiN, metallic oxides, and resins. However, the material preferably has a low Young modulus to increase the vibration displacement, and in consideration of the difference in linear expansion coefficient between the material and the channel substrate 100, $SiO_2$ having a relatively small difference in linear expansion coefficient is most preferable as the material of the vibration film 103.

Figure 6A:
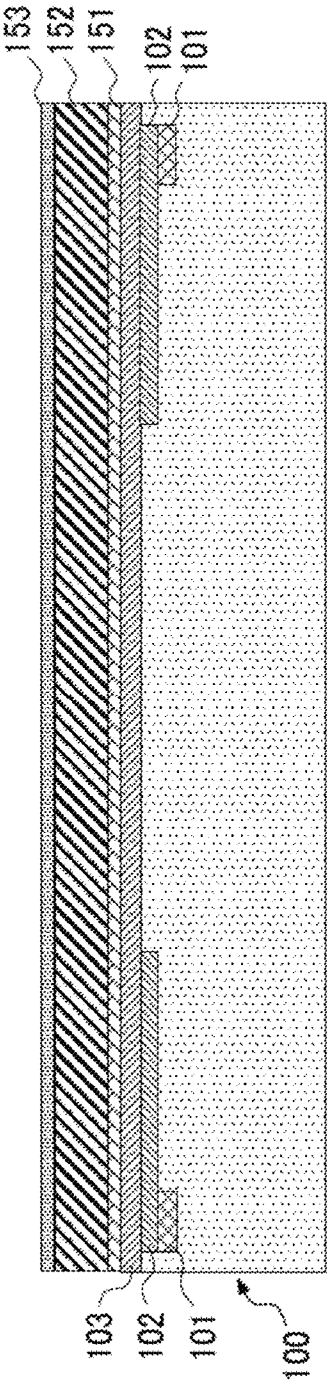
FIGS. 6A and 6B are diagrams each illustrating processes of forming a first electrode layer, a piezoelectric layer, and a second electrode layer over the vibration film of the actuator in FIG. 1.
Figure 6B:
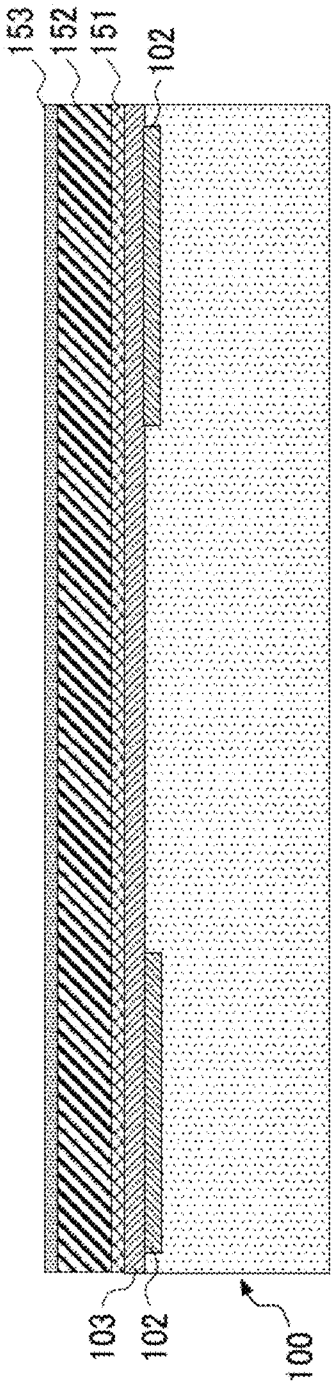

Subsequently, as illustrated in FIGS. 6A and 6B, a first electrode layer 151, a piezoelectric layer 152, and a second electrode layer 153 are formed over the vibration film 103. The first electrode layer 151 and the second electrode layer 153 are preferably made of a metal having low electrical resistivity and low reactivity, such as Ir or Mo.

When the drive circuit 101 and the wiring 102 are built in the channel substrate 100 to increase the density of the nozzles 12*a* as in the present embodiment, the piezoelectric material of the piezoelectric layer 152 preferably has a film formation temperature of 450° C. or less not to damage the drive circuit 101 and the wiring 102. Aluminum nitride (AlN) may be used as the piezoelectric material having the film formation temperature of 450° C. or less.

AlN as the piezoelectric material provides the following advantages. The piezoelectric film 52 in which a crystal orientation is aligned can enhance the piezoelectric property thereof. An orientation control layer between the vibration film 103 and the first electrode 51 is formed in order to control the crystal orientation. When the piezoelectric material of the piezoelectric film 52 is AlN, AlN as the orientation control layer can bring a lattice constant of the first electrode 51 made of Mo closer to that of AlN. As a result, the crystal orientation of the piezoelectric film 52 is aligned to enhance the piezoelectric property.

Typically, the first electrode layer 151 and the second electrode layer 153 are formed by sputtering. The piezoelectric layer 152 may be formed by, for example, sputtering or sol-gel method. However, the sol-gel method is not suitable for forming a film on the channel substrate 100 including the drive circuit 101 and the wiring 102 because of the high film formation temperature. Accordingly, the piezoelectric layer 152 is preferably formed into a film by sputtering.

Figure 7A:
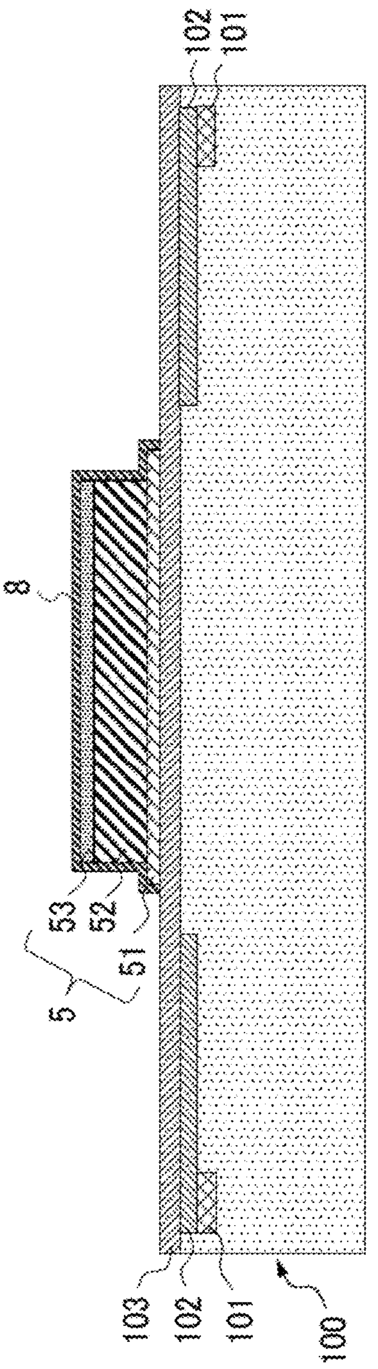
FIGS. 7A and 7B are diagrams each illustrating a process of forming an insulating film of the actuator in FIG. 1.
Figure 7B:
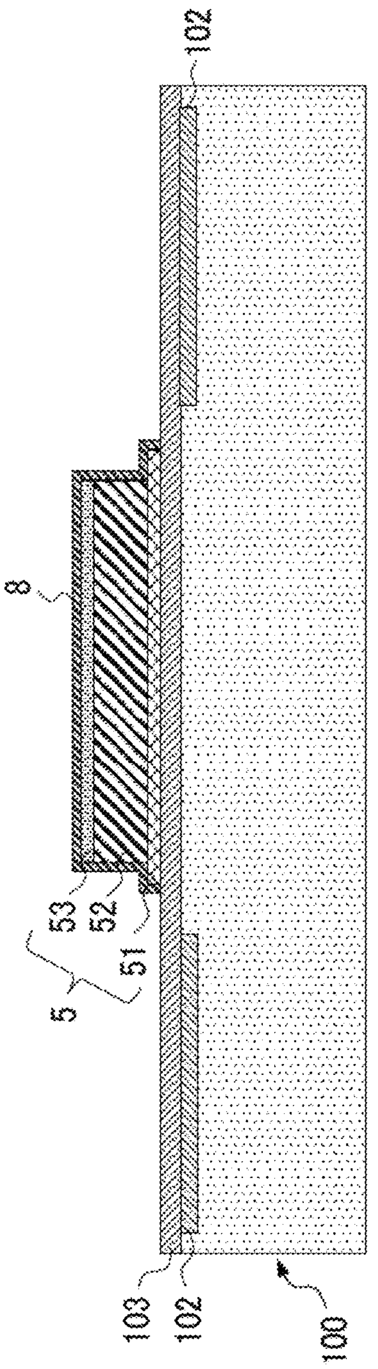

After the film formation, the first electrode layer 151, the piezoelectric layer 152, and the second electrode layer 153 are formed into desired shapes as illustrated in FIGS. 7A and 7B to obtain the piezoelectric element 5 including the first electrode 51, the piezoelectric film 52, and the second electrode 53. The first electrode layer 151, the piezoelectric layer 152, and the second electrode layer 153 are processed by photolithography and etching to obtain the first electrode 51, the piezoelectric film 52, and the second electrode 53 having the desired shapes. Etching includes wet etching and dry etching, but dry etching is preferable in order to prevent corrosion of the first electrode 51, the second electrode 53, and the piezoelectric film 52. After the dry etching, a residue due to the processing of the dry etching is likely to remain. For this reason, a cleaning step may be performed to remove the residue after the first electrode 51, the piezoelectric film 52, and the second electrode 53 are formed.

After the first electrode 51, the piezoelectric film 52, and the second electrode 53 are formed, the insulating film 8 is formed by film formation and etching. Similarly to the vibration film 103, the insulating film 8 preferably has the electrical insulation property, a low Young modulus, and a linear expansion coefficient close to that of other components. Specifically, $SiO_2$, which is the same material as that of the vibration film 103, is preferable.

Figure 8A:
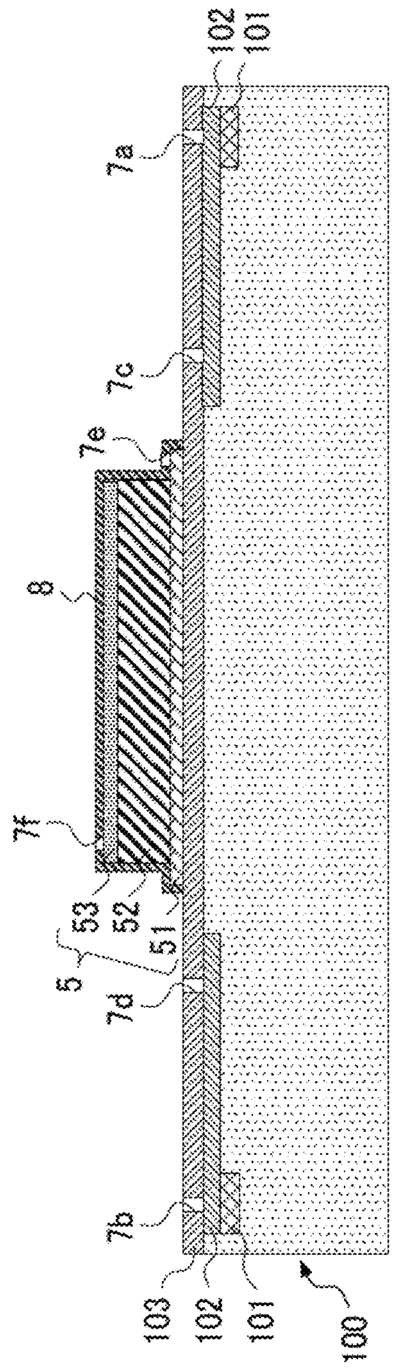
FIGS. 8A and 8B are diagrams each illustrating a process of forming multiple contacts of the actuator in FIG. 1.
Figure 8B:
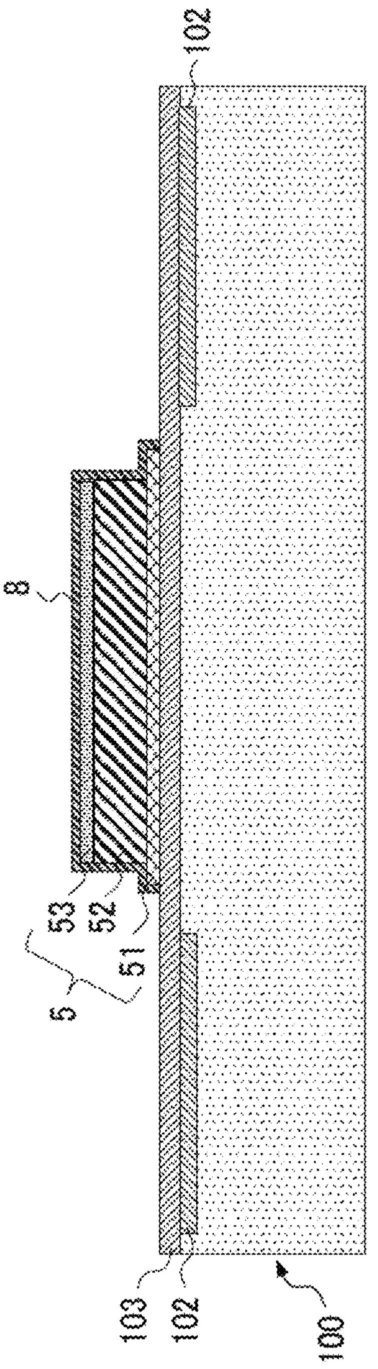

After the insulating film 8 is formed, as illustrated in FIGS. 8A and 8B, four hole-shaped contacts (the first contact 7*a*, the second contact 7*b*, the third contact 7*c*, and the fourth contact 7*d*) are formed in the vibration film 103 by photolithography and etching. Two hole-shaped contacts (i.e., the fifth contact 7*e* and the sixth contact 7*f*) are formed in the insulating film 8.

Figure 9A:
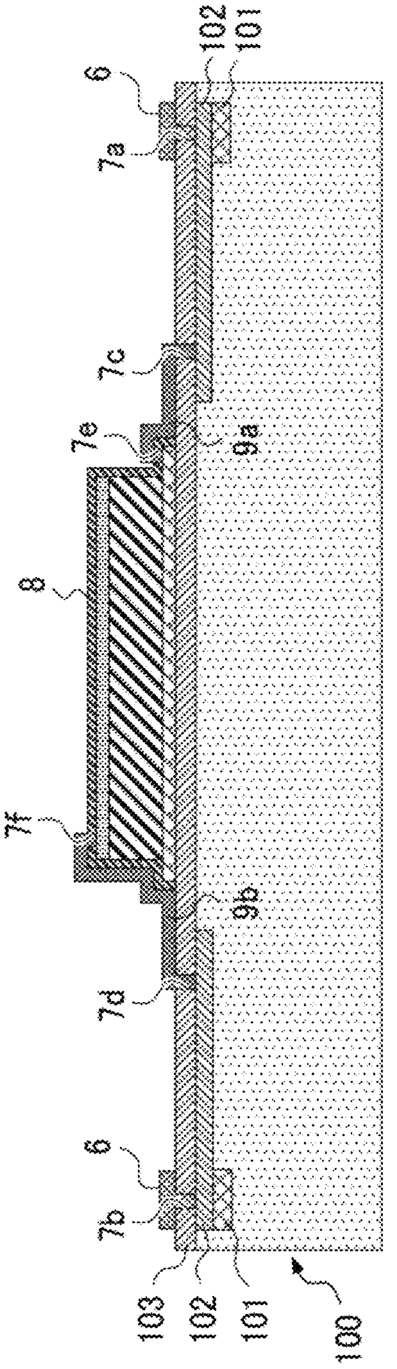
FIGS. 9A and 9B are diagrams each illustrating a process of forming a lead of the actuator in FIG. 1.
Figure 9B:
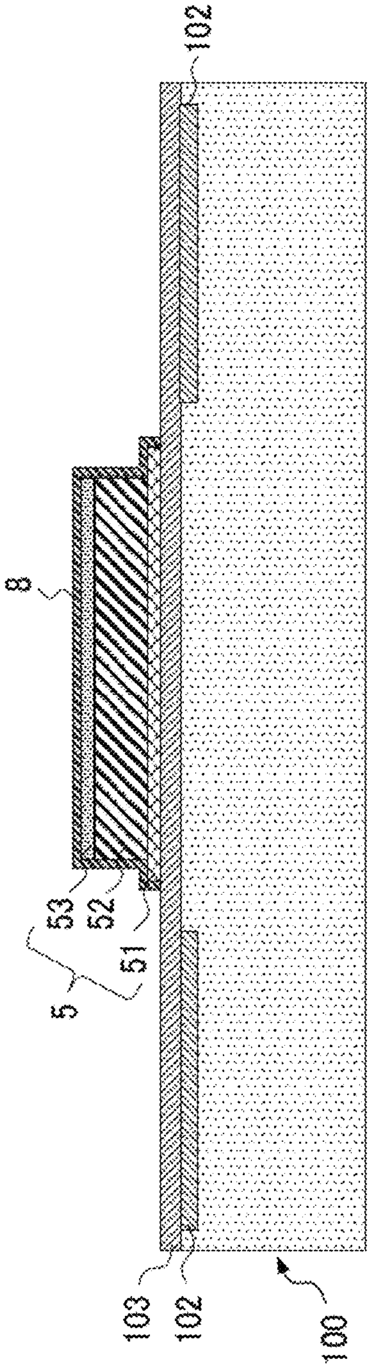

Next, as illustrated in FIGS. 9A and 9B, the first lead 9*a*, the second lead 9*b*, and the electrical connection pads 6 are formed. The first lead 9*a*, the second lead 9*b*, and the electrical connection pads 6 are typically made of Al or aluminum-copper (Al—Cu) alloy. In this step, one end of the first lead 9*a* is electrically connected to the first electrode 51 through the fifth contact 7*e* of the insulating film 8, and the other end of the first lead 9*a* is electrically connected to the wiring 102 through the third contact 7*c* of the vibration film 103. One end of the second lead 9*b* is electrically connected to the second electrode 53 through the sixth contact 7*f* of the insulating film 8, and the other end of the second lead 9*b* is electrically connected to the wiring 102 through the fourth contact 7*d* of the vibration film 103. The electrical connection pads 6 are electrically connected to the wiring 102 through the first contact 7*a* and the second contact 7*b* of the vibration film 103, respectively.

Figure 10A:
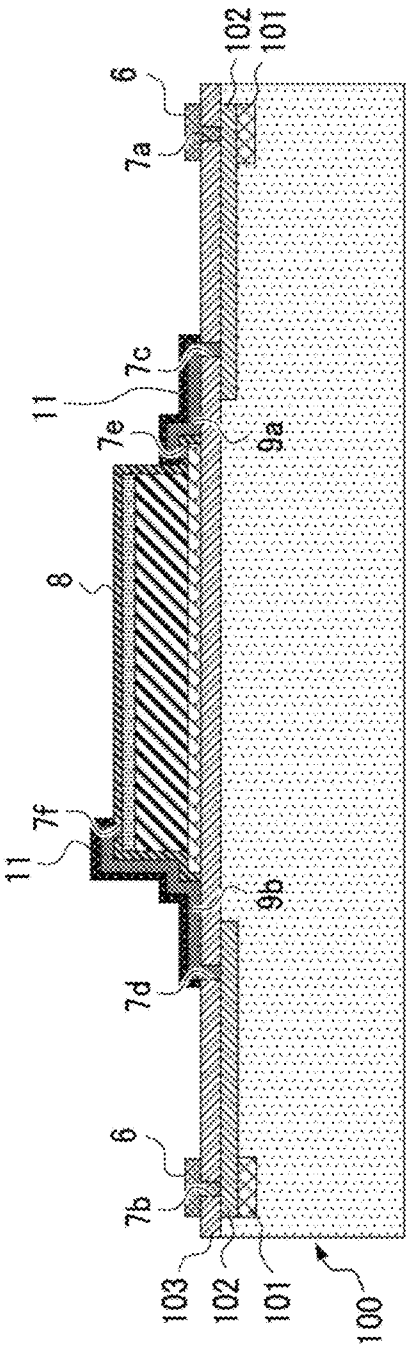
FIGS. 10A and 10B are diagrams each illustrating a process of forming a moisture-proof film of the actuator in FIG. 1.
Figure 10B:
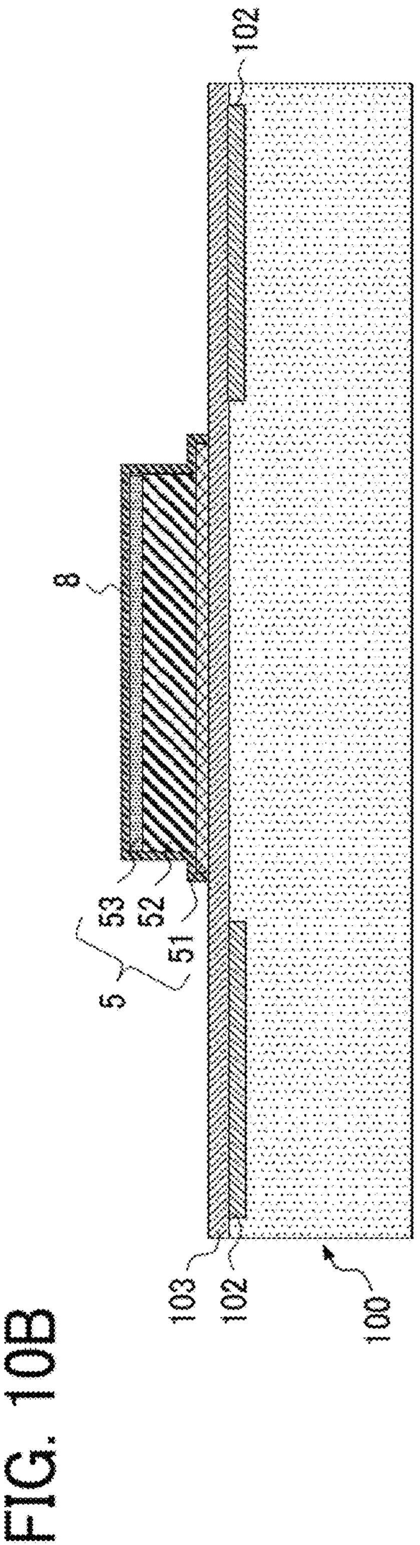
Figure 11A:
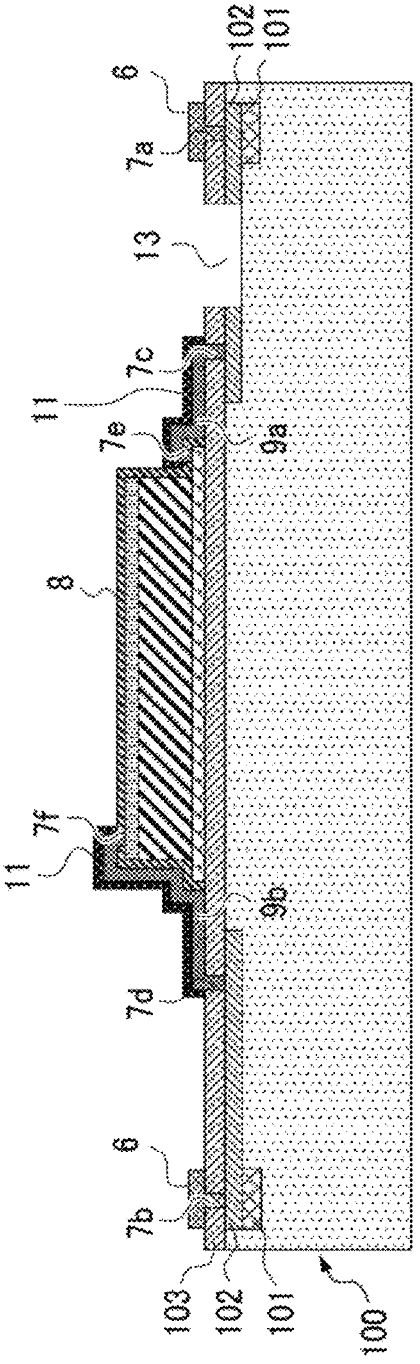
FIGS. 11A and 11B are diagrams each illustrating a process of forming an ink supply port of the actuator in FIG. 1.
Figure 11B:
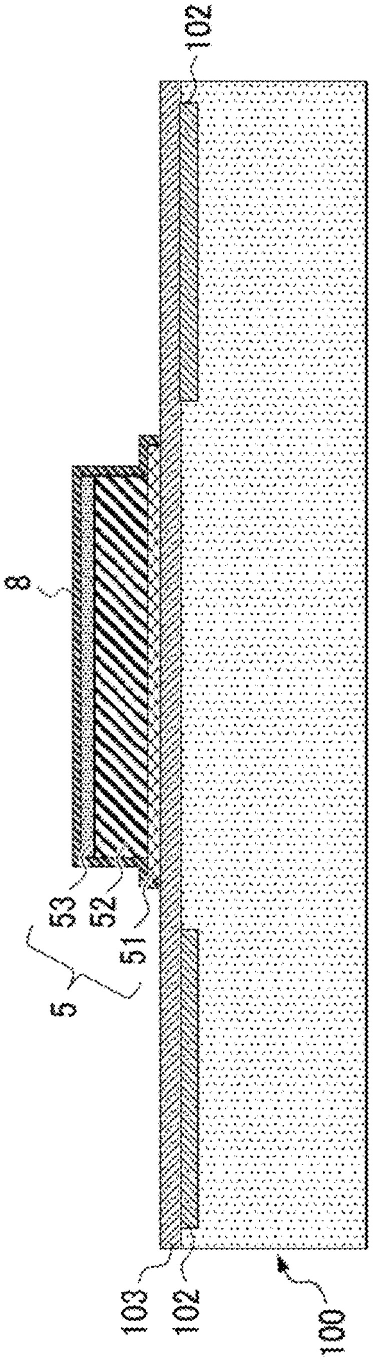
Figure 12:
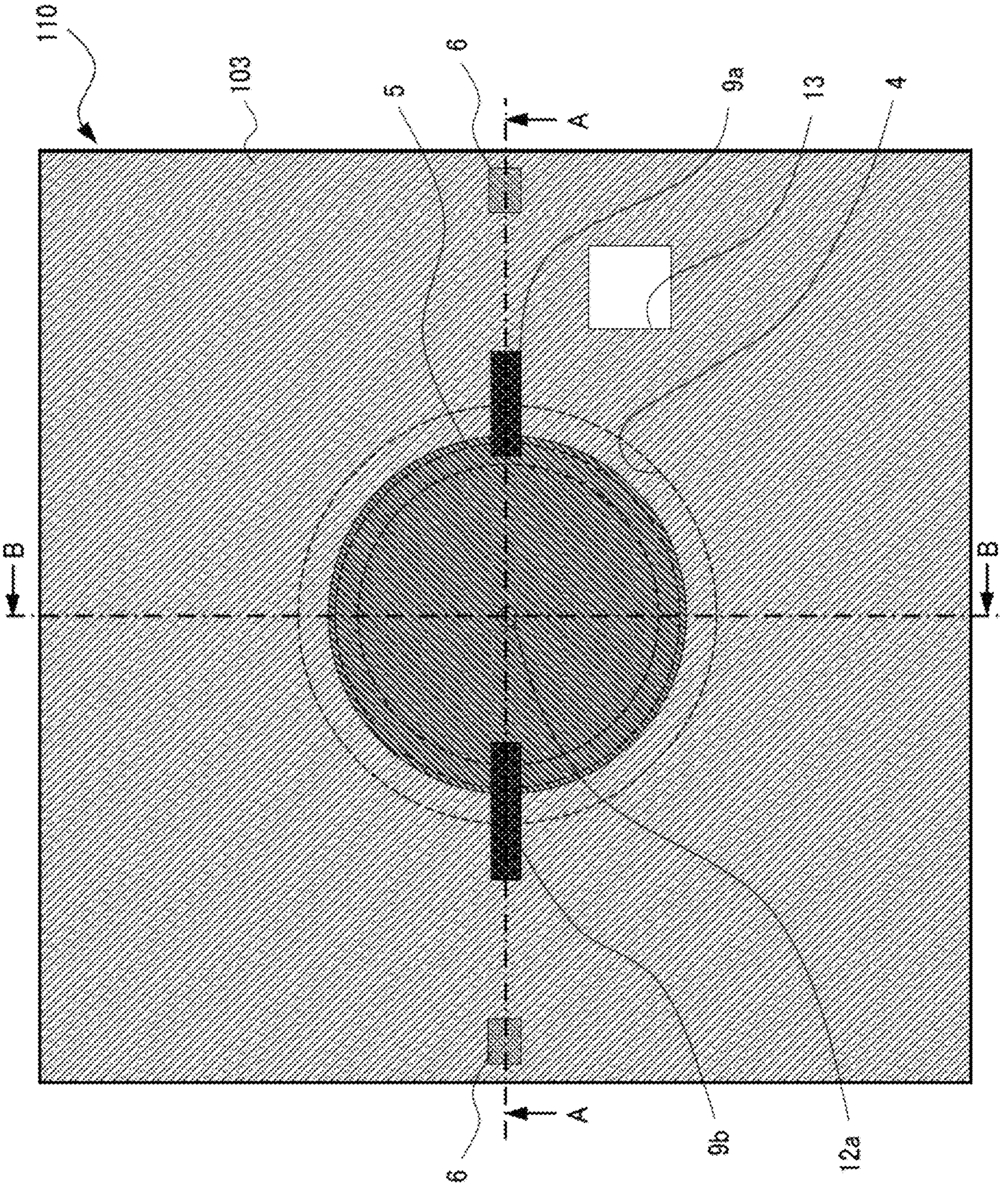
FIG. 12 is a diagram illustrating a position of the ink supply port of the actuator in FIG. 1.

As illustrated in FIGS. 10A and 10B, the moisture-proof film 11 is formed to cover the first lead 9*a*, the second lead 9*b*, the third contact 7*c*, the fourth contact 7*d*, the fifth contact 7*e*, and the sixth contact 7*f* After the moisture-proof film 11 is formed, as illustrated in FIGS. 11A and 11B, the vibration film 103 and the wiring 102 are etched to form an ink supply hole 13. When the actuator 110 illustrated in FIG. 11A is viewed from above, the ink supply hole 13 is preferably formed at a position where the ink supply hole 13 does not interfere with the piezoelectric elements 5, the first lead 9*a*, the second lead 9*b*, and the electrical connection pads 6 as illustrated in FIG. 12.

Figure 13A:
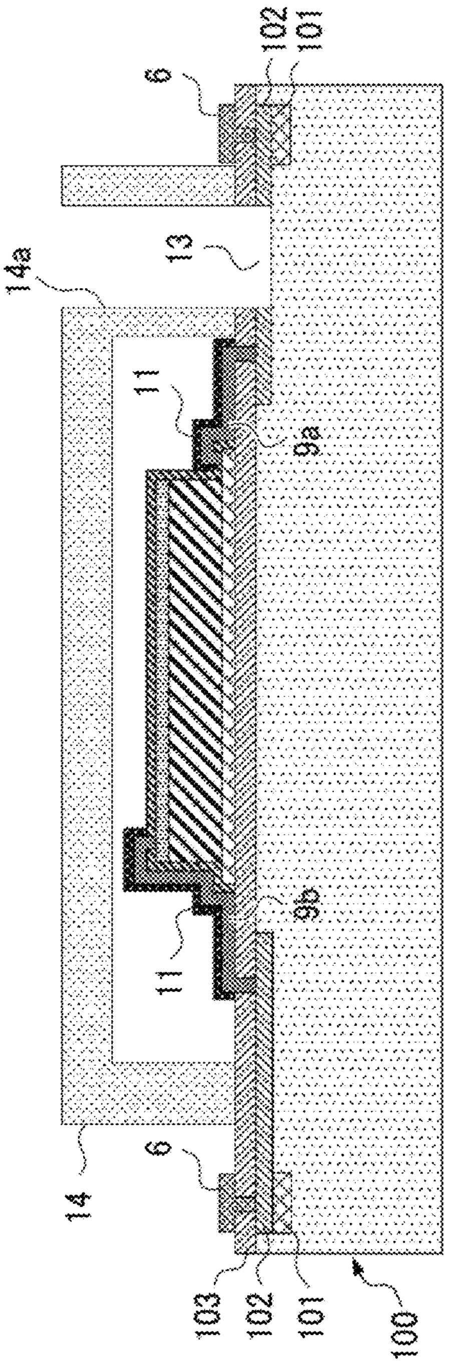
FIGS. 13A and 13B are diagrams each illustrating a process of forming an ink supply portion of the actuator in FIG. 1.
Figure 13B:
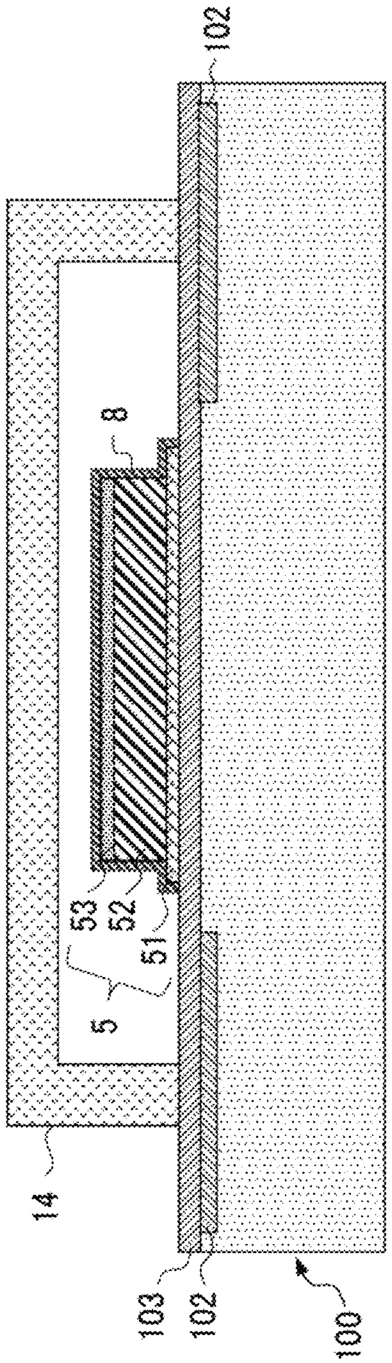

Next, as illustrated in FIGS. 13A and 13B, a frame 14 having an ink supply portion 14*a* is bonded to the vibration film 103. The ink supply portion 14*a* communicates with the ink supply hole 13. Although various materials such as a resin having ink resistance and a Si substrate can be used for the frame 14, the frame 14 is preferably formed by etching the Si substrate in terms of processability and linear expansion coefficient. When the frame 14 is formed of the Si substrate, the frame 14 is strongly bonded to the vibration film 103 with an adhesive that forms a siloxane bond.

Figure 14A:
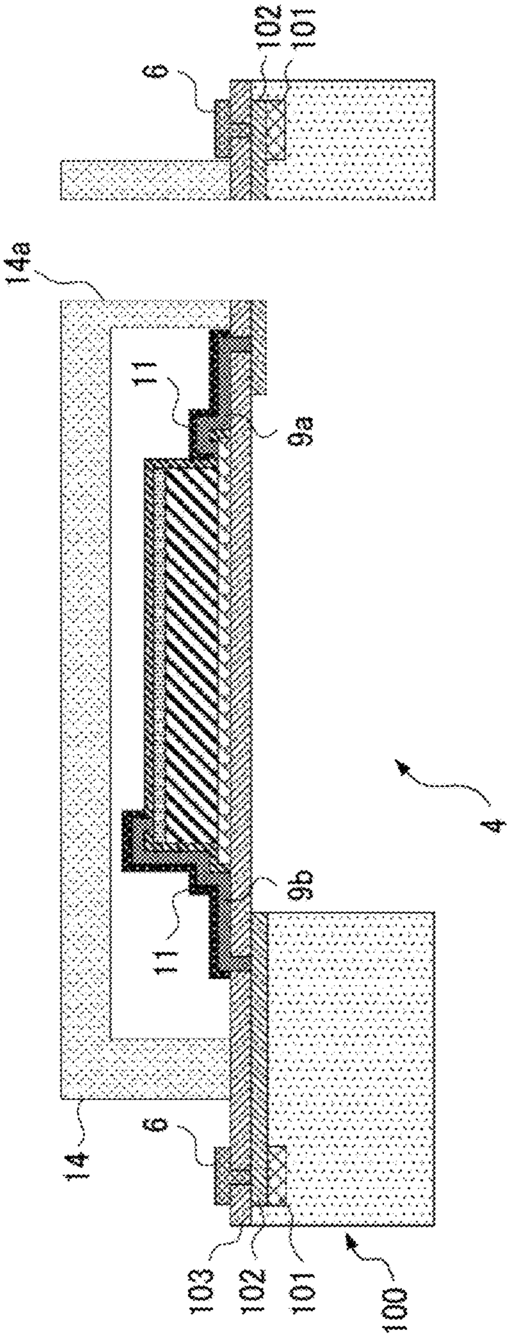
FIGS. 14A and 14B are diagrams each illustrating a process of forming a liquid chamber of the actuator in FIG. 1.
Figure 14B:
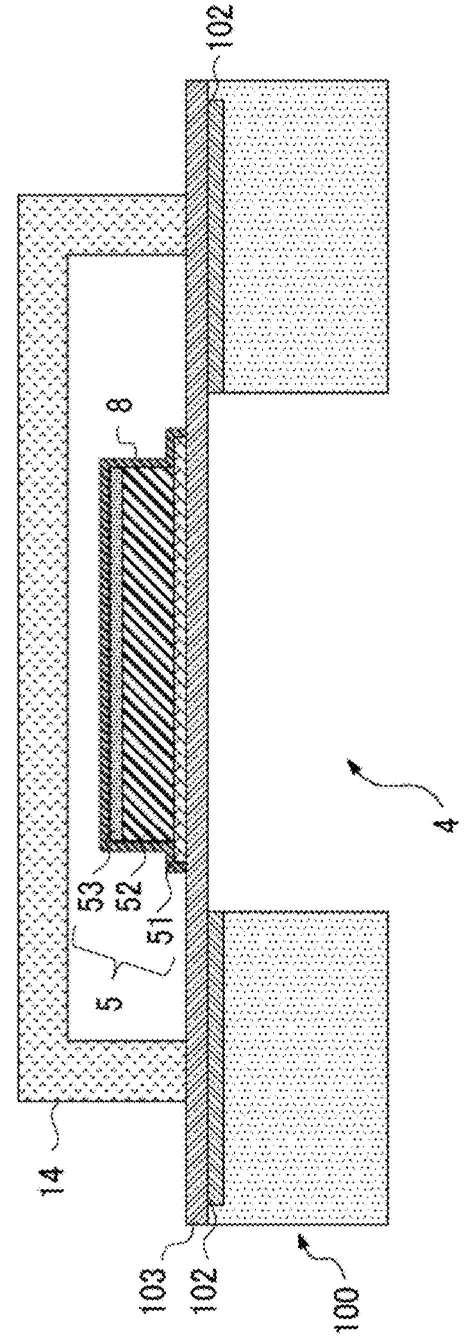

Subsequently, as illustrated in FIGS. 14A and 14B, the channel substrate 100 is processed by Si etching from the back face thereof to form a hole-shaped void space. In the present embodiment, the void space functions as the liquid chamber 4 to store a liquid. The liquid chamber 4 communicates with the ink supply portion 14*a*. Although there are two types of etching methods, wet etching and dry etching, dry etching is typically used because a desired shape can be easily obtained. Through the processes described above, the actuator 110 is completed.

Figure 15A:
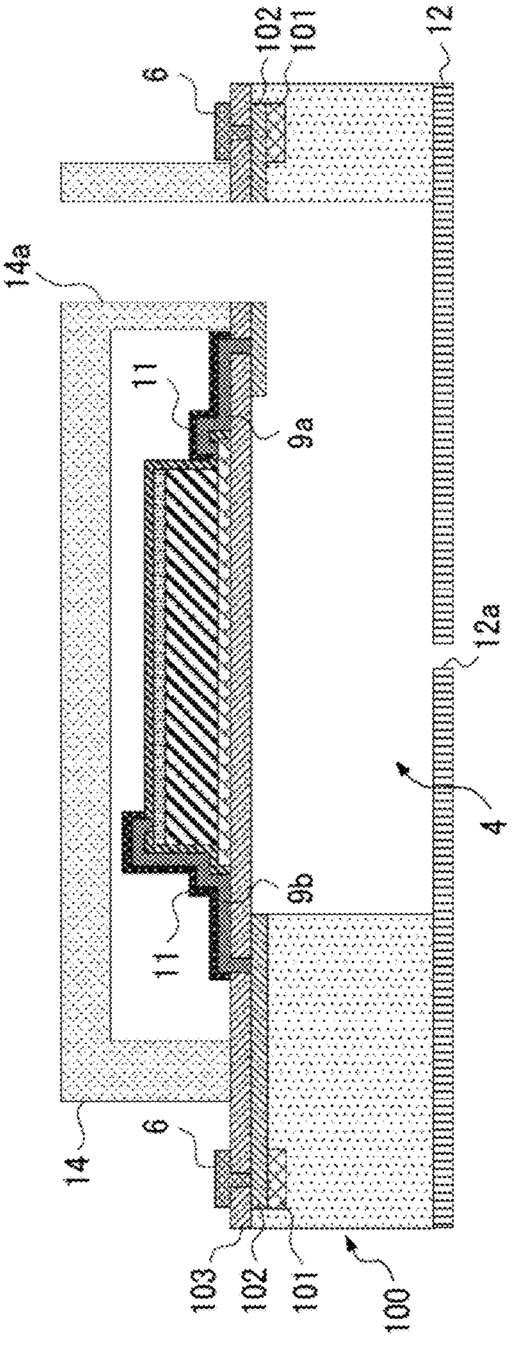
FIGS. 15A and 15B are diagrams each illustrating a process of forming a nozzle plate of the actuator in FIG. 1.
Figure 15B:
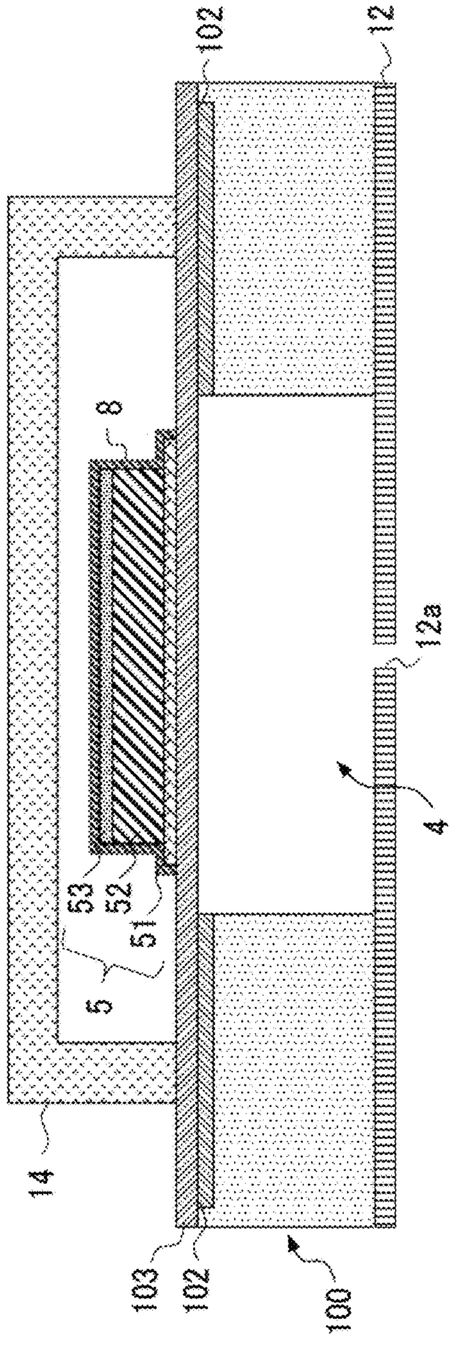

When the actuator 110 is used in the liquid discharge head, as illustrated in FIGS. 15A and 15B, the nozzle plate 12 in which the nozzle 12*a* is formed is attached to a side of the channel substrate 100 on which the liquid chamber 4 is open. The nozzle plate 12 is formed of steel use stainless (SUS) material, and a hole (i.e., the nozzle 12*a*) is formed in the SUS material by punching or Si dry etching, but dry etching is preferably used from the viewpoint of dimensional accuracy. The liquid discharge head is manufactured through the above-described processes.

As described above, according to the present embodiment, the actuator 110 includes the channel substrate 100, the vibration film 103, the piezoelectric element 5. The liquid chamber 4 is formed in the channel substrate 100. The vibration film 103 is laminated over the channel substrate 100. The vibration film 103 serves as a part of a wall of the liquid chamber 4. The piezoelectric element 5 is laminated over the vibration film 103 and is opposed to the liquid chamber 4. The piezoelectric element 5 has an outer shape that fits within the liquid chamber 4 at least at a portion laminated over the vibration film 103. Specifically, the piezoelectric element 5 includes the first electrode 51 laminated over the vibration film 103, the piezoelectric film 52 laminated over the first electrode 51, and the second electrode 53 laminated over the piezoelectric film 52. The first electrode 51 has the outer shape that fits within the liquid chamber 4.

As described above, the piezoelectric element 5 is laminated over the side of the vibration film 103 opposite to the side serving as the part of the wall of the liquid chamber 4.

As described above, the first electrode 51 has the outer shape equal to or larger than an outer shape of the piezoelectric film 52. Accordingly, the vibration displacement of the vibration film 103 in the membrane region can be increased to enhance the deformation efficiency of the vibration film 103.

As described above, the channel substrate 100 includes the drive circuit 101 that applies voltages to the first electrode 51 and the second electrode 53. Thus, the voltages applied to the first electrode 51 and the second electrode 53 of the piezoelectric element 5 can be changed for each actuator 110.

As described above, the piezoelectric layer 152 forming the piezoelectric film 52 is made of a material that can be formed into a film at a temperature of 450° C. or less.

As described above, the piezoelectric layer 152 forming the piezoelectric film 52 is formed by sputtering. Accordingly, even when the drive circuit 101 is built in the channel substrate 100, the piezoelectric layer 152 can be formed into a film at a process temperature at which the drive circuit 101 is not damaged.

As described above, the void space is the liquid chamber 4 to store the liquid. Accordingly, the actuator 110 can be provided that efficiently discharges liquid with a small voltage.

Configuration of Liquid Discharge Head

Figure 16A:
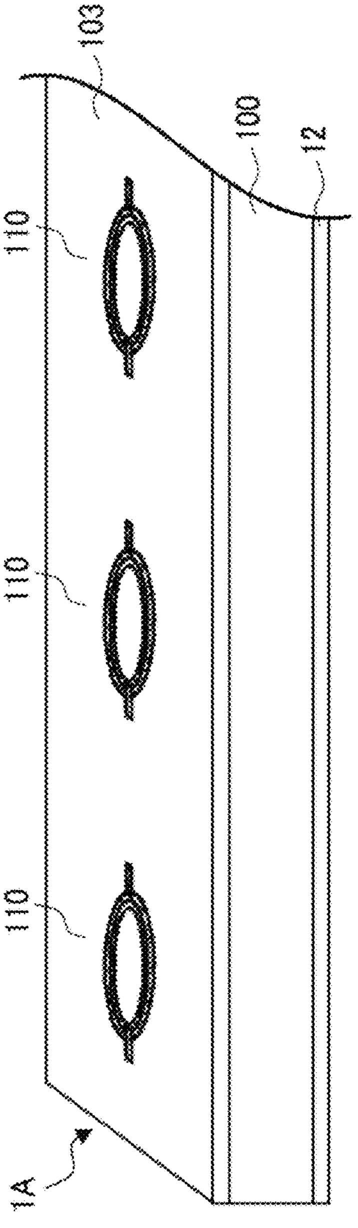
FIGS. 16A and 16B are schematic perspective views of a liquid discharge head according to an embodiment of the present disclosure.
Figure 16B:
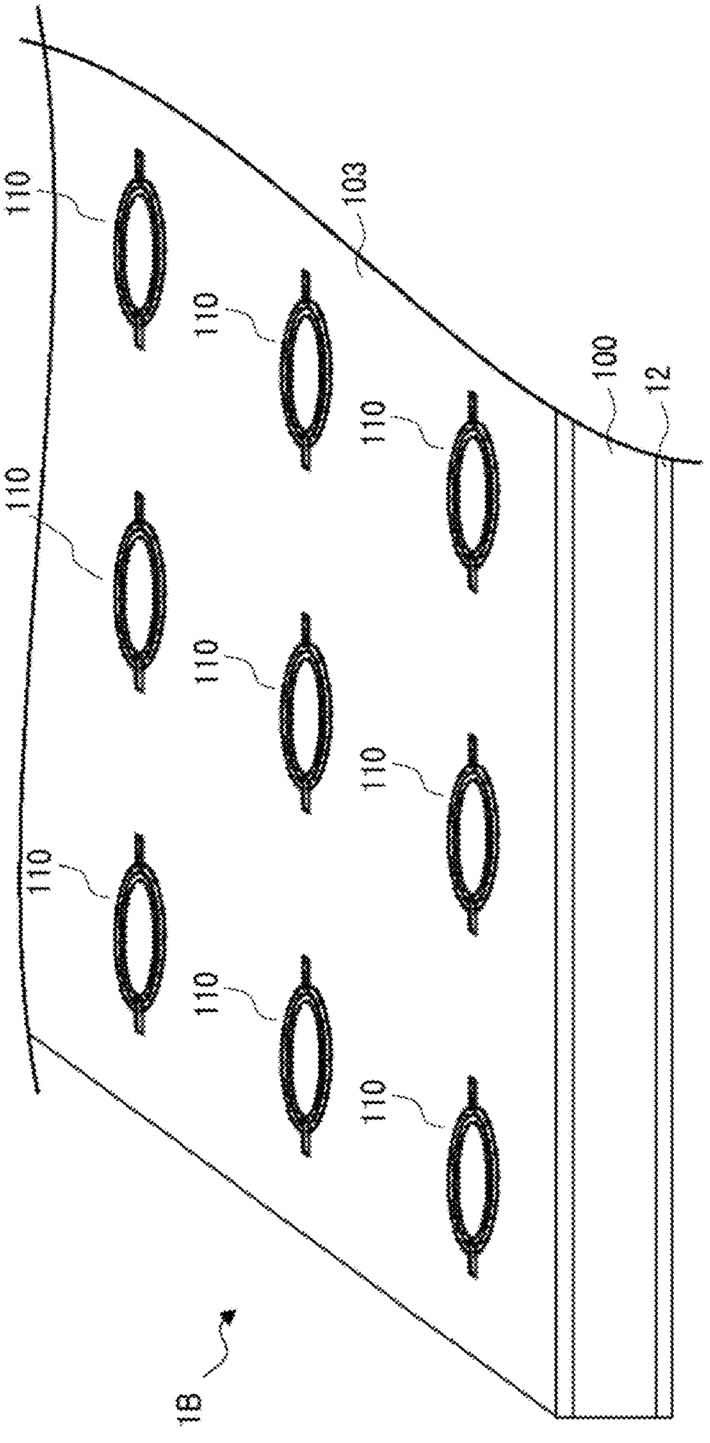

FIGS. 16A and 16B are schematic perspective views of a liquid discharge head according to an embodiment of the present disclosure.

The actuator 110 described above is not necessarily used as a single actuator. For example, as illustrated in FIG. 16A, a liquid discharge head 1A includes multiple actuators 110 arrayed in a row to discharge liquid from multiple nozzles 12*a*. Alternatively, as illustrated in FIG. 16B, a liquid discharge head 1B includes multiple actuators 110 two-dimensionally arrayed in rows and columns to discharge liquid from multiple nozzles 12*a*.

As the configuration of the liquid discharge head 1A or 1B, the multiple actuators 110, each of which is manufactured by the above-described manufacturing method, may be arranged (assembled). Alternatively, the above-described manufacturing method may be changed for multiple piezoelectric elements 5, and the multiple piezoelectric elements 5 may be simultaneously manufactured on the vibration film 103 to form an integrated configuration.

Figure 17:
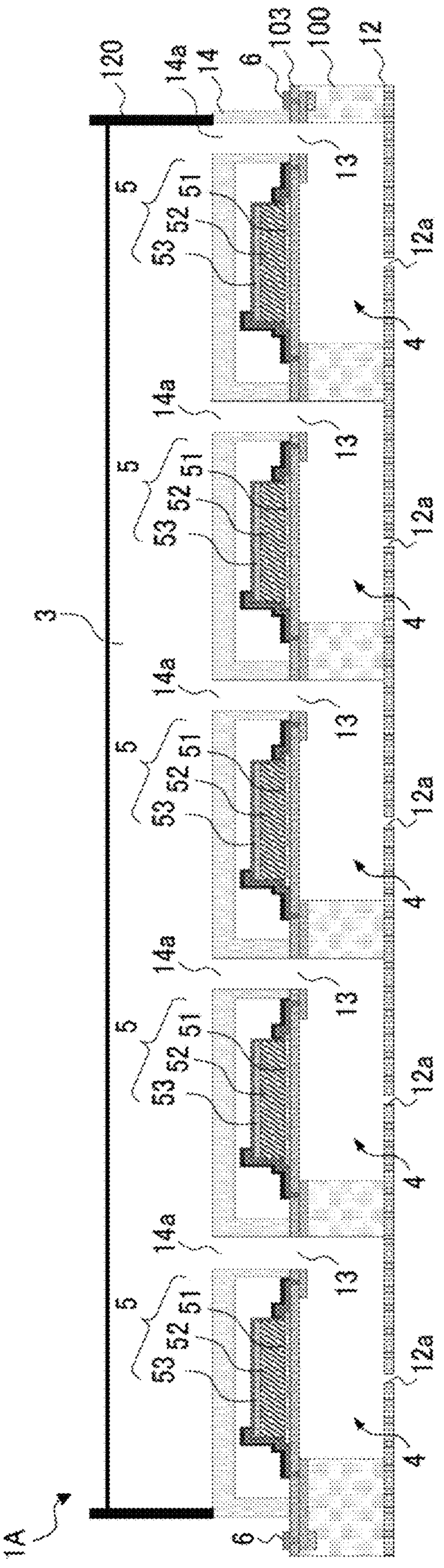
FIG. 17 is a schematic cross-sectional view of the liquid discharge head according to an embodiment of the present disclosure.

FIG. 17 is a schematic cross-sectional view of the liquid discharge head according to an embodiment of the present disclosure. The liquid discharge head 1A illustrated in FIG. 17 discharges liquid from the multiple nozzles 12*a* arrayed in a row. The multiple piezoelectric elements 5 corresponding to the respective nozzles 12*a* are simultaneously manufactured by the series of manufacturing processes described above. The multiple piezoelectric elements 5 each including the first electrode 51, the piezoelectric film 52, and the second electrode 53 is individually provided for the corresponding liquid chambers 4 (nozzles 12*a*). The multiple piezoelectric elements 5 are electrically independent of each other, and voltages having different polarities can be applied to the piezoelectric elements 5.

The liquid discharge head 1A includes a frame component 120 bonded to the frame 14 of the actuators 110, and a common liquid chamber 3 is defined by the frame component 120. When liquid (e.g., ink) is discharged, the liquid is supplied from the common liquid chamber 3 through the ink supply portion 14*a* and the ink supply hole 13 to the liquid chamber 4, pressurized by the piezoelectric element 5, and discharged from the nozzle 12*a*. The electrical connection pads 6 for connection with a power supply component such as an external power supply are disposed at both ends of the liquid discharge head 1A.

As described above, in the present embodiment, each of the liquid discharge heads 1A and 1B includes the actuator having the liquid chamber 4 to store liquid and the nozzle 12*a* communicating with the liquid chamber 4. Each of the liquid discharge heads 1A and 1B uses the above-described actuator 110 as the actuator.

As described above, each of the liquid discharge heads 1A and 1B includes the multiple actuators 110. The first electrode 51 and the second electrode 53 of the piezoelectric element 5 of each of the multiple actuators 110 are separated and electrically independent of each other, and voltages having different polarities are applied to the first electrode 51 and the second electrode 53.

As a result, a liquid discharge head having good discharge efficiency can be provided.

Second Embodiment

Configuration of Actuator

Figure 18:
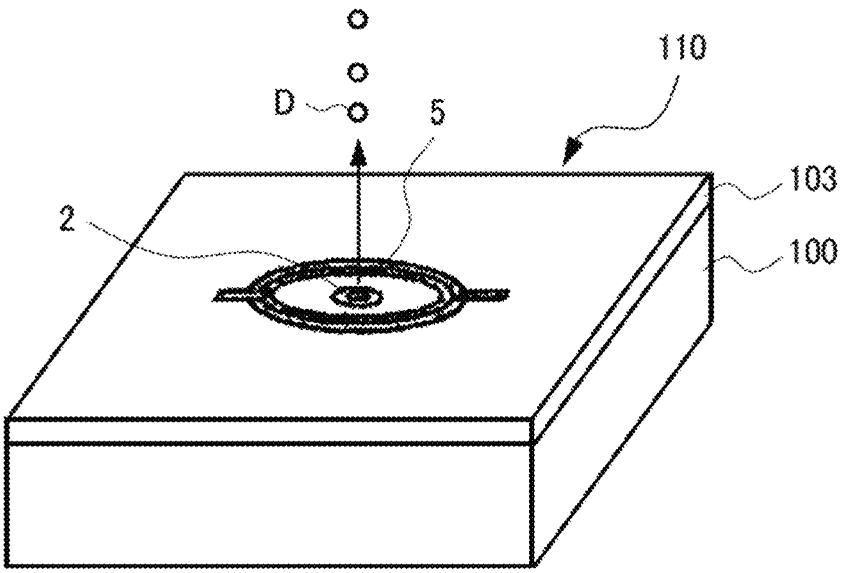
FIG. 18 is a schematic perspective view of an actuator according to another embodiment of the present disclosure.
Figure 19:
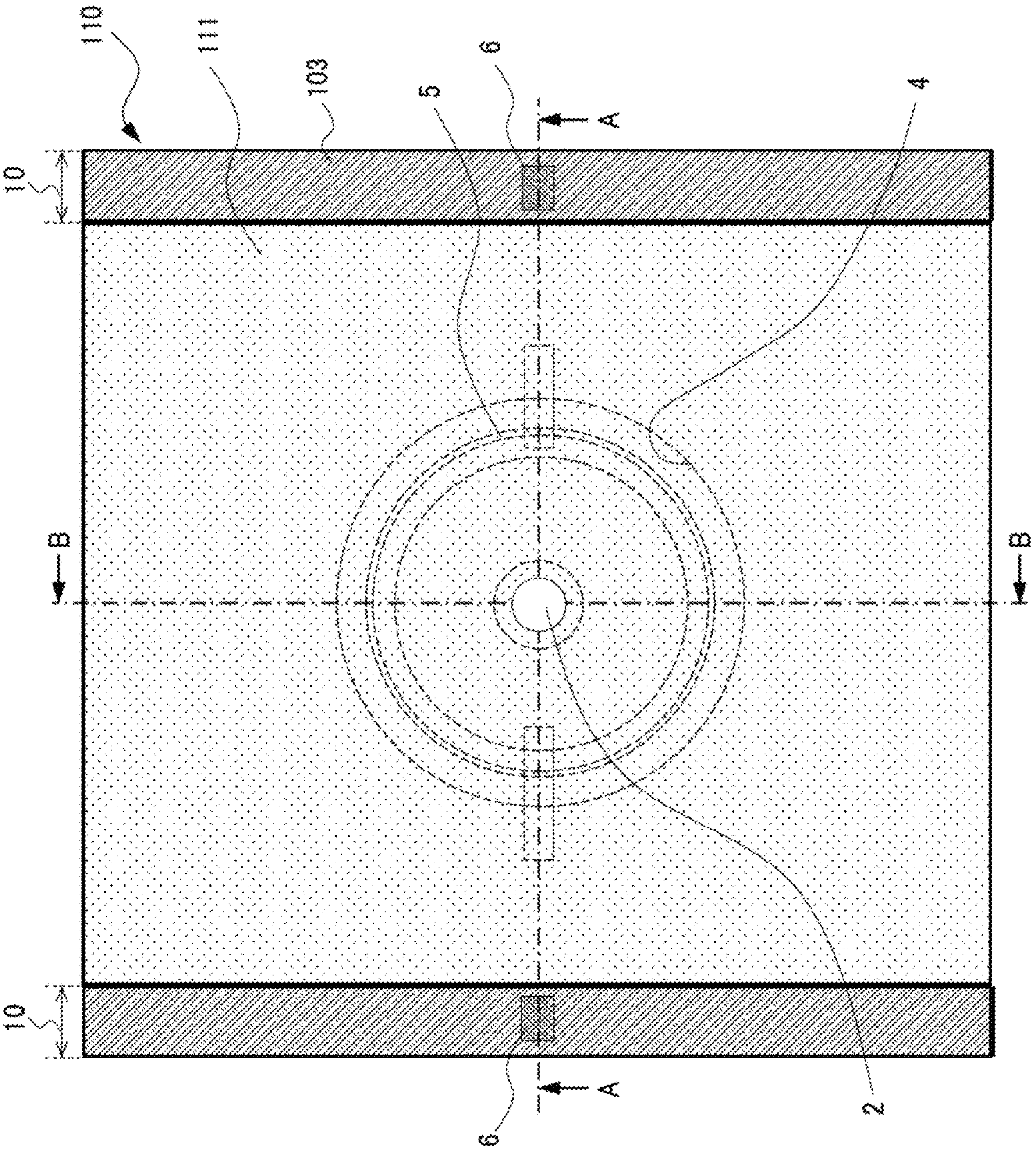
FIG. 19 is a plan view of the actuator in FIG. 18, illustrating relative positions between the piezoelectric element and the liquid chamber of the actuator.

A schematic configuration of an actuator 110 according to a second embodiment is described below with reference to FIGS. 18 and 19. FIG. 18 is a schematic perspective view of the actuator 110 according to the second embodiment. FIG. 19 is a plan view of the actuator 110, illustrating relative positions between the piezoelectric element 5 and the liquid chamber 4 of the actuator 110. A nozzle forming portion 111 illustrated in FIG. 19 is omitted in FIG. 18 for simplicity.

The actuator 110 is, for example, used in a nozzle vibration type liquid discharge head that discharges a liquid in the liquid chamber 4 from a nozzle 2. In the liquid discharge head, the actuator 110 vibrates a face in which the nozzle 2 is disposed (i.e., a nozzle face) to discharge the liquid.

The actuator 110 has a thin film shape and includes the channel substrate 100, the vibration film 103, and the annular piezoelectric element 5 over the vibration film 103 in the lamination direction. When the actuator 110 is used in the liquid discharge head, for example, the liquid discharge head includes the nozzle forming portion (film) 111 over the actuator 110 (over the vibration film 103 and the piezoelectric element 5). As illustrated in FIG. 19, the channel substrate 100 defines the liquid chamber 4 opposed to the piezoelectric element 5. The liquid chamber 4 is a void space according to the present embodiment. The nozzle 2 communicates with the liquid chamber 4. The actuator 110 includes electrical connection pads 6 to be connected to an electrical component, such as an external power supply, in pad openings 10 at both ends thereof.

In the actuator 110 having the above-described configuration, the piezoelectric element 5 vibrates the vibration film 103 around the nozzle 2 to discharge the liquid in the liquid chamber 4 from the nozzle 2 as a droplet D.

Such a nozzle vibration type liquid discharge head according to the second embodiment can discharge the droplet D of the liquid with a smaller power than a typical unimorph-type piezoelectric head which vibrates a wall of the liquid chamber opposed to a nozzle face having the nozzles to discharge liquid. Thus, power saving of the actuator 110 can be achieved.

The increased density of the nozzles 2 limits a space for laying out a wiring for voltage application. In such a case, it is difficult to install the wiring on the surface of substrate (e.g., the channel substrate 100). However, the wiring and the drive circuit can be installed in the substrate having the nozzles 2 with high density. Lead zirconate titanate (PZT) is common in a typical material of a piezoelectric element because of good piezoelectric properties, but the film formation and crystallization temperature of PZT is 600° C. or higher. When PZT is used as the material of the piezoelectric element, the drive circuit and the wiring in the substrate do not withstand the high temperature. In such a case, a piezoelectric material having the film formation temperature lower than that of PZT can be used. Such a piezoelectric material has poor piezoelectric properties than PZT.

However, as described above, since the nozzle vibration type head can discharge droplets of the liquid with the smaller power than the typical unimorph-type piezoelectric head, even when the piezoelectric material having the poor piezoelectric properties than that of PZT is used, the nozzle vibration type head can discharge droplets of the liquid as desired. Accordingly, the nozzle vibration type head using the piezoelectric material such as a non-lead material, which has a low film formation and crystallization temperature but has the poor piezoelectric properties, can discharge droplets of the liquid as desired. As a result, the wiring and the drive circuit can be installed in the substrate, and the nozzles 2 can be arranged with high density. Further, the nozzle vibration type head can reduce the volume of the liquid chamber 4. As a result, the head can be downsized.

Figure 20A:
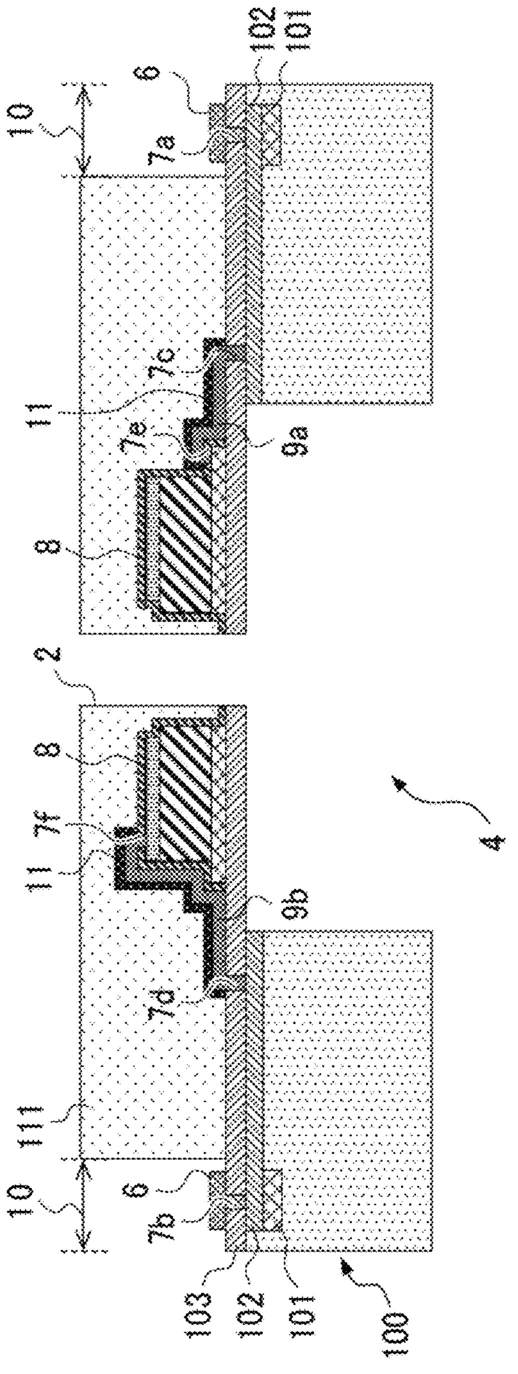
FIGS. 20A and 20B are cross-sectional views of the actuator taken along line A-A or line B-B in FIG. 19.
Figure 20B:
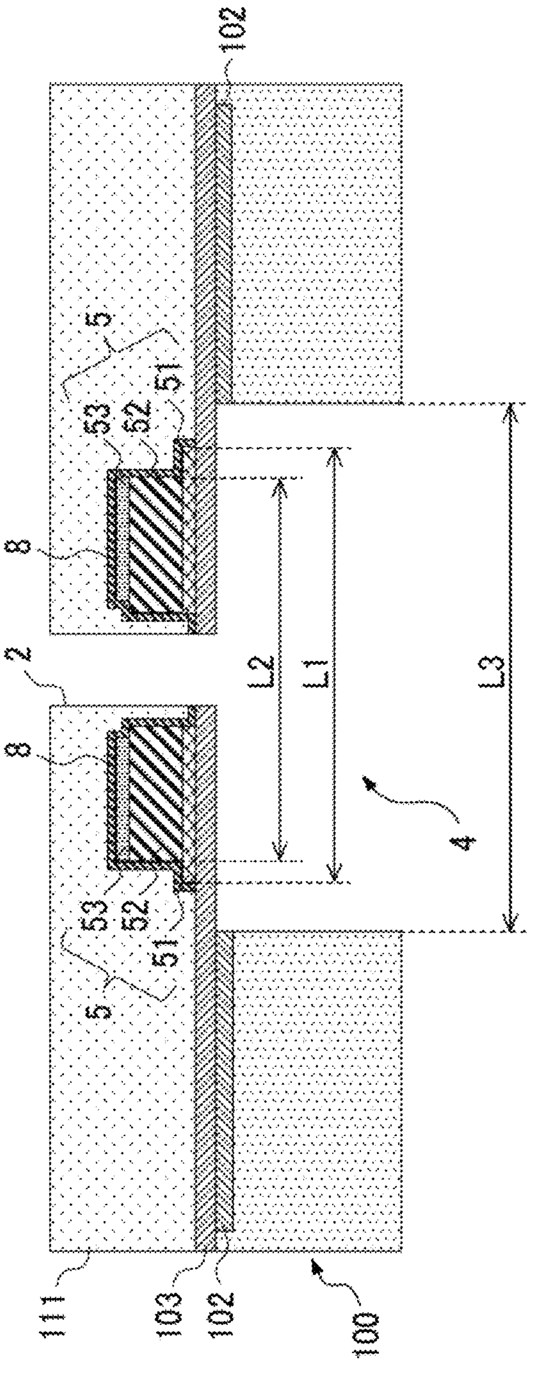

The internal structure of the actuator 110 is described below with reference to FIGS. 20A and 20B. FIG. 20A is a cross-sectional view of the actuator 110 taken along line A-A in FIG. 19. FIG. 20B is a cross-sectional view of the actuator 110 taken along line B-B in FIG. 19.

In FIGS. 20A and 20B, the channel substrate 100 as a substrate according to the present embodiment is the SOI substrate. The channel substrate 100 includes the drive circuit 101 and the wiring 102 on a side on which the vibration film 103 is formed.

The drive circuit 101 includes, for example, a transistor and a resistor. The wiring 102 includes the wiring for applying a voltage to the first electrode 51 and the wiring for applying a voltage to the second electrode 53. The wiring 102 is electrically connected to the electrical connection pads 6 through the hole-shaped first contact 7*a* and second contact 7*b* opened in the vibration film 103.

When the actuator 110 is used in the liquid discharge head, the nozzle forming portion 111 is disposed over the vibration film 103 and the piezoelectric element 5. The nozzle forming portion 111 defines the nozzle 2 and protects the piezoelectric element 5. The nozzle forming portion 111 may have a liquid-repellent film (water-repellent film) on the nozzle face. The liquid-repellent film on the nozzle face prevents liquid from adhering to the nozzle face. Due to such a configuration, liquid can be discharged from the nozzle 2 without being affected by the liquid adhering to the nozzle face. When the solvent of the liquid is aqueous, perfluorodecyltrichlorosilane or perfluorooctyltrichlorosilane can be used as the material of the liquid-repellent film.

The piezoelectric element 5 of the actuator 110 includes the first electrode 51, the piezoelectric film 52, and the second electrode 53. The first electrode 51 may be referred to as the lower electrode, and the second electrode 53 may be referred to as the upper electrode. The piezoelectric element 5 is laminated over one side of the vibration film 103. The other side of the vibration film 106 serves as a part of the wall of the liquid chamber 4. The piezoelectric element 5 is covered with the insulating film 8.

The insulating film 8 has the hole-shaped fifth contact 7*e* through which the first electrode 51 and the first lead 9*a* are electrically connected, and the hole-shaped sixth contact 7*f* through which the second electrode 53 and the second lead 9*b* are electrically connected. The first lead 9*a* is disposed over the insulating film 8 to electrically connect the first electrode 51 and the wiring 102 of the channel substrate 100. The second lead 9*b* is disposed over the insulating film 8 to electrically connect the second electrode 53 and the wiring 102.

One end of the first lead 9*a* is electrically connected to the first electrode 51 through the fifth contact 7*e* of the insulating film 8, and the other end of the first lead 9*a* is electrically connected to the wiring 102 through the third contact 7*c* of the vibration film 103. One end of the second lead 9*b* is electrically connected to the second electrode 53 through the sixth contact 7*f* of the insulating film 8, and the other end of the second lead 9*b* is electrically connected to the wiring 102 through the fourth contact 7*d* of the vibration film 103.

The first lead 9*a* and the second lead 9*b* are covered with the moisture-proof film 11. Due to such a configuration, moisture may permeate through the nozzle forming portion 111 made of resin but does not reach the first lead 9*a* and the second lead 9*b*. As a result, corrosion of the first lead 9*a* and the second lead 9*b* can be prevented.

The moisture-proof film 11 is preferably made of a material having the electrical insulation property. Since the details of the moisture-proof film 11 are the same as those of the first embodiment described above, the description thereof is omitted here. Since the moisture-proof film 11 has two functions of the electrical insulation and moisture-proof properties, the actuator 110 can be thinned compared to when an insulating film is separately formed under the moisture-proof film 11. Such a configuration facilitates deformation of the vibration film 103, and enhances vibration efficiency.

The first electrode 51 and the second electrode 53 of the piezoelectric element 5 are made of a metal having high corrosion resistance such as Ir or Mo. As a result, the first electrode 51 and the second electrode 53 are hardly corroded by moisture permeating through the nozzle forming portion 111.

In the above-described configuration, in the actuator 110, as a predetermined drive waveform (voltage) is applied to the first electrode 51 and the second electrode 53 of the piezoelectric element 5, the piezoelectric film 52 vibrates, and the vibration film 103 vibrates in the vertical direction in FIGS. 20A and 20B. As the vibration film 103 vibrates, the pressure of the liquid in the liquid chamber 4 is changed, and the liquid is discharged from the nozzle 2.

As illustrated in FIG. 20B, when the first electrode 51 has a width L1 (outer diameter), the liquid chamber 4 has a width L3 (outer diameter) larger than the width L1 of the first electrode 51 (i.e., L1<L3). In other words, the first electrode 51 has an outer shape that fits within an outer shape of the liquid chamber 4 in the width direction perpendicular to the lamination direction. Each of the piezoelectric film 52 and the second electrode 53 has a width L2 (outer diameter) smaller than the width L1 of the first electrode 51 (i.e., L1>L2). In other embodiments, the first electrode 51 may have an outer shape equal to the outer shape (e.g., the width L2) of the piezoelectric film 52 and the second electrode 53.

The vibration film 103 according to the second embodiment (i.e., the nozzle vibration type actuator) has a deformation behavior similar to the deformation behavior in the first embodiment described with reference to FIG. 4. In the actuator 110 according to the present embodiment, the first electrode 51 and the liquid chamber 4 have a width relation as described above, and an electrode film and a protective film are not formed in the regions (see FIG. 4) between the region where the piezoelectric element 5 is disposed and the fixed ends P1 and P2 as much as possible. Accordingly, portions of the vibration film 103 near the fixed ends P1 and P2 are easily movable, and the vibration displacement can be increased as indicated by the solid line in FIG. 4. As a result, the vibration film 103 can be sufficiently vibrated. Further, the deformation efficiency of the vibration film 103 with respect to voltage increases, and the voltage for discharging the liquid can be lowered.

Manufacturing Method

A method of manufacturing the actuator is described below with reference to FIGS. 21A to 29B. FIGS. 21A to 29B are cross-sectional views of the actuator 110 during a manufacturing process of the actuator 110 according to the present embodiment, in which a suffix A indicates a cross section taken along line A-A in FIG. 19 and a suffix B indicates a cross section taken along line B-B in FIG. 19.

Figure 21A:
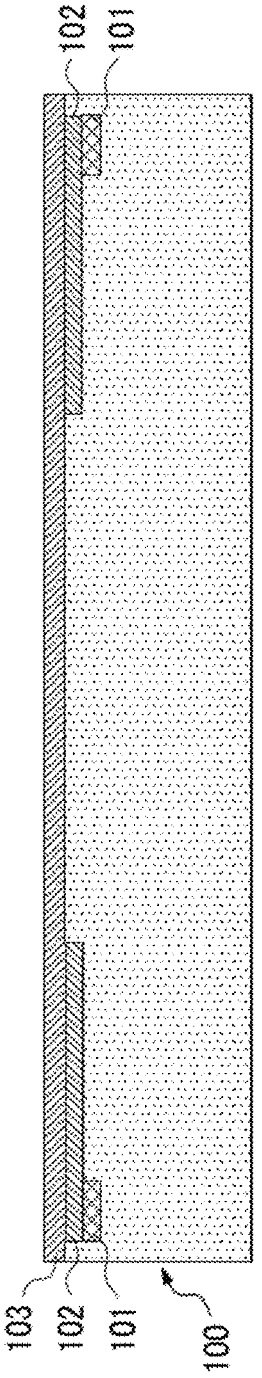
FIGS. 21A and 21B are diagrams each illustrating processes of forming the drive circuit, the wiring, and the vibration film over the channel substrate of the actuator in FIG. 18.
Figure 21B:
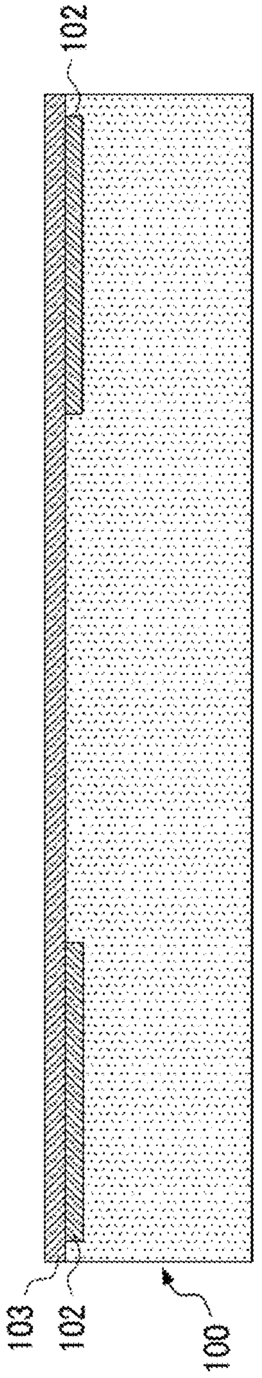

As illustrated in FIGS. 21A and 21B, the drive circuit 101 including a transistor and a resistor and the wiring 102 are formed over a silicon film of the channel substrate 100 as the SOI substrate. When the drive circuit 101 is not incorporated in the channel substrate 100, the Si substrate may be used as the channel substrate 100.

Then, the vibration film 103 is formed over one side of the channel substrate 100 on which the drive circuit 101 and the wiring 102 are formed. The vibration film 103 may be made of a material having at least the electrical insulation property, such as $SiO_2$, SiN, metallic oxides, and resins. However, the material preferably has a low Young modulus to increase the vibration displacement, and in consideration of the difference in linear expansion coefficient between the material and the channel substrate 100, $SiO_2$ having a relatively small difference in linear expansion coefficient is most preferable as the material of the vibration film 103.

Figure 22A:
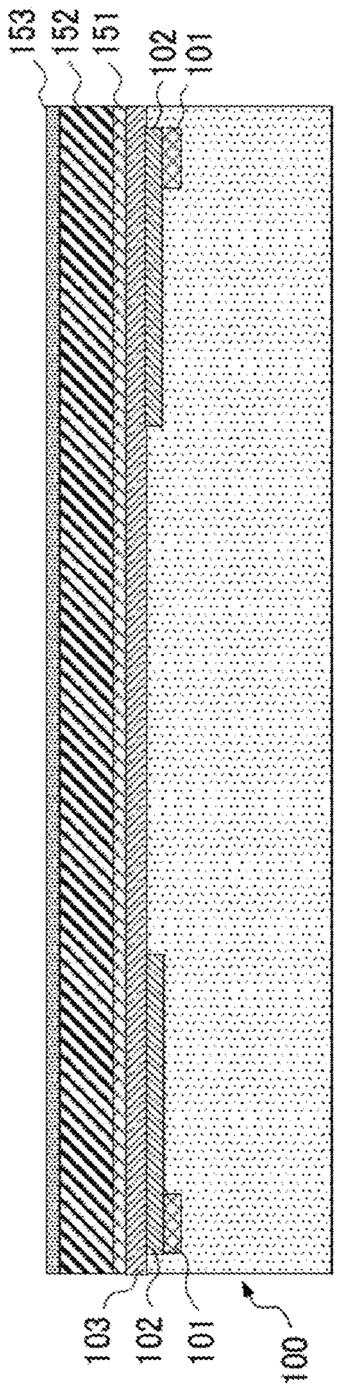
FIGS. 22A and 22B are diagrams each illustrating processes of forming the first electrode layer, the piezoelectric layer, and the second electrode layer over the vibration film of the actuator in FIG. 18.
Figure 22B:
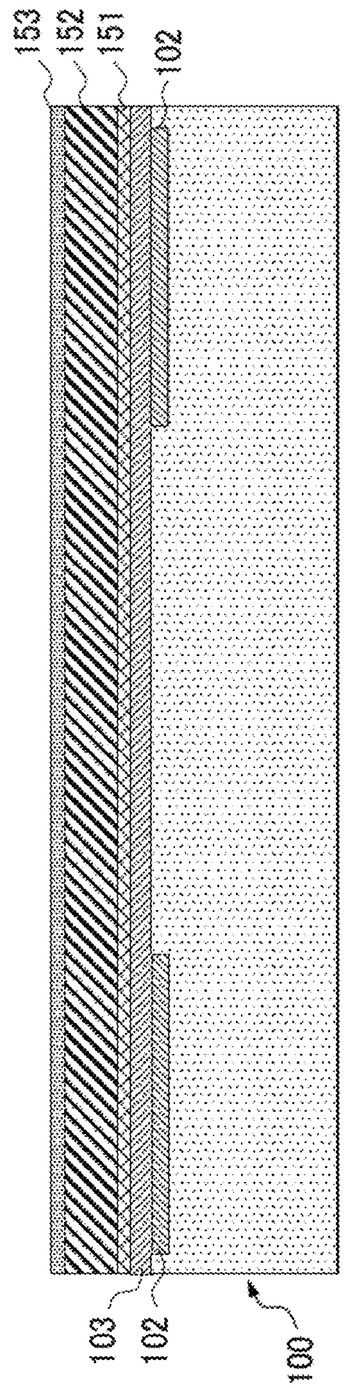

Subsequently, as illustrated in FIGS. 22A and 22B, the first electrode layer 151, the piezoelectric layer 152, and the second electrode layer 153 are formed over the vibration film 103. The first electrode layer 151 and the second electrode layer 153 are preferably made of a metal having low electrical resistivity and low reactivity, such as Ir or Mo. A description of the piezoelectric material of the piezoelectric layer 152, which is the same as that in the first embodiment, is omitted below.

Typically, the first electrode layer 151 and the second electrode layer 153 are formed by sputtering. The piezoelectric layer 152 may be formed by, for example, sputtering or sol-gel method. However, the sol-gel method is not suitable for forming a film on the channel substrate 100 including the drive circuit 101 and the wiring 102 because of the high film formation temperature. Accordingly, the piezoelectric layer 152 is preferably formed into a film by sputtering.

Figure 23A:
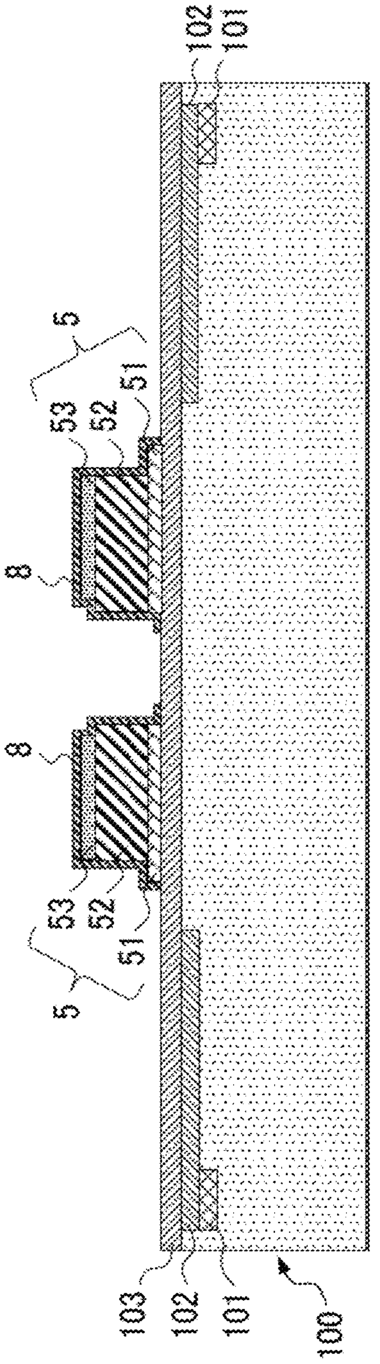
FIGS. 23A and 23B are diagrams each illustrating a process of forming the insulating film of the actuator in FIG. 18.
Figure 23B:
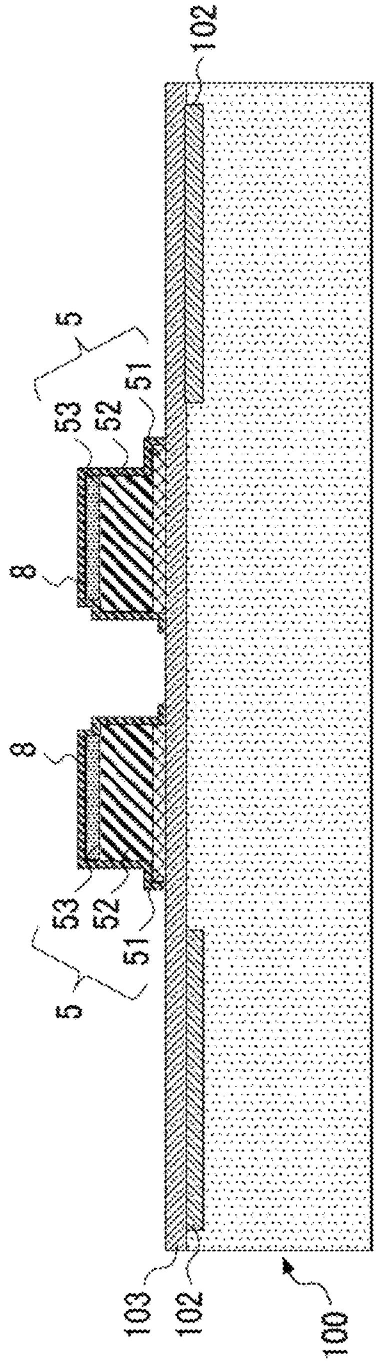

After the film formation, the first electrode layer 151, the piezoelectric layer 152, and the second electrode layer 153 are formed into desired shapes as illustrated in FIGS. 23A and 23B to obtain the piezoelectric element 5 including the first electrode 51, the piezoelectric film 52, and the second electrode 53. The first electrode layer 151, the piezoelectric layer 152, and the second electrode layer 153 are processed by photolithography and etching to obtain the first electrode 51, the piezoelectric film 52, and the second electrode 53 having the desired shapes. Etching includes wet etching and dry etching, but dry etching is preferable in order to prevent corrosion of the first electrode 51, the second electrode 53, and the piezoelectric film 52. After the dry etching, a residue due to the processing of the dry etching is likely to remain. For this reason, a cleaning step may be performed to remove the residue after the first electrode 51, the piezoelectric film 52, and the second electrode 53 are formed.

After the first electrode 51, the piezoelectric film 52, and the second electrode 53 are formed, the insulating film 8 is formed by film formation and etching. Similarly to the vibration film 103, the insulating film 8 preferably has the electrical insulation property, a low Young modulus, and a linear expansion coefficient close to that of other components. Specifically, $SiO_2$, which is the same material as that of the vibration film 103, is preferable.

Figure 24A:
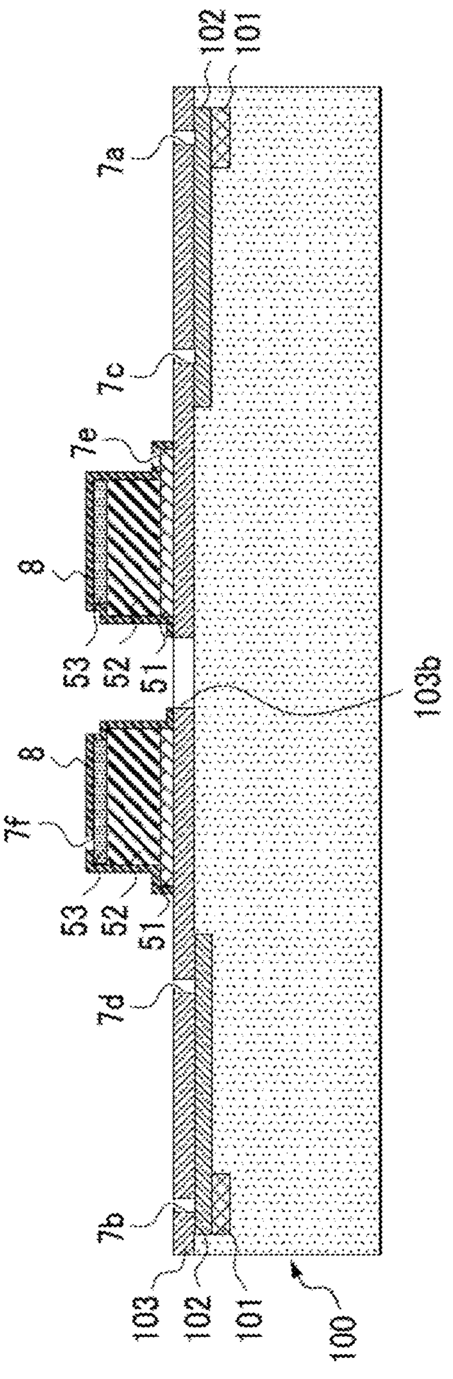
FIGS. 24A and 24B are diagrams each illustrating a process of forming the multiple contacts of the actuator in FIG. 18.
Figure 24B:
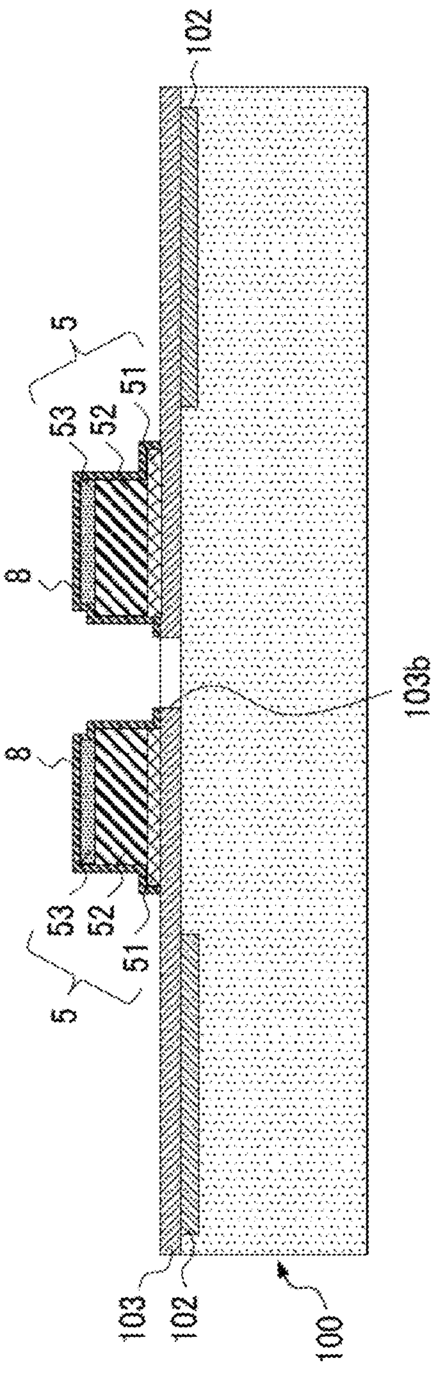

After the insulating film 8 is formed, as illustrated in FIGS. 24A and 24B, four hole-shaped contacts (the first contact 7*a*, the second contact 7*b*, the third contact 7*c*, and the fourth contact 7*d*) are formed in the vibration film 103 by photolithography and etching. At this time, a nozzle formation hole 103*b* for forming the nozzle 2 may be formed in the vibration film 103. Preferably, the nozzle formation hole 103*b* and the four contacts (i.e., the first contact 7*a*, the second contact 7*b*, the third contact 7*c*, and the fourth contact 7*d*) are simultaneously formed to facilitate the subsequent process. The two hole-shaped contacts (i.e., the fifth contact 7*e* and the sixth contact 7*f*) are formed in the insulating film 8.

Figure 25A:
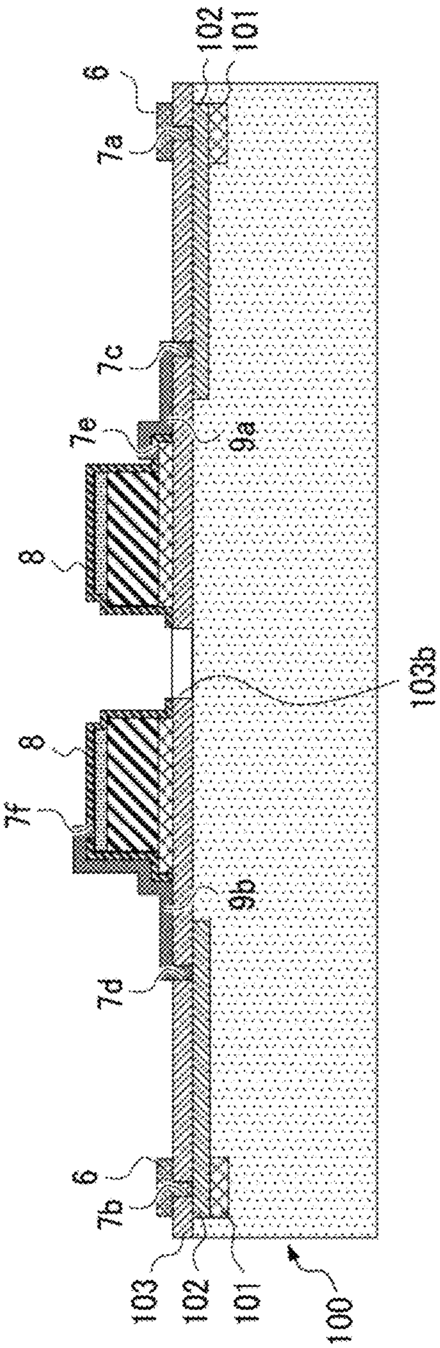
FIGS. 25A and 25B are diagrams each illustrating a process of forming the lead of the actuator in FIG. 18.
Figure 25B:
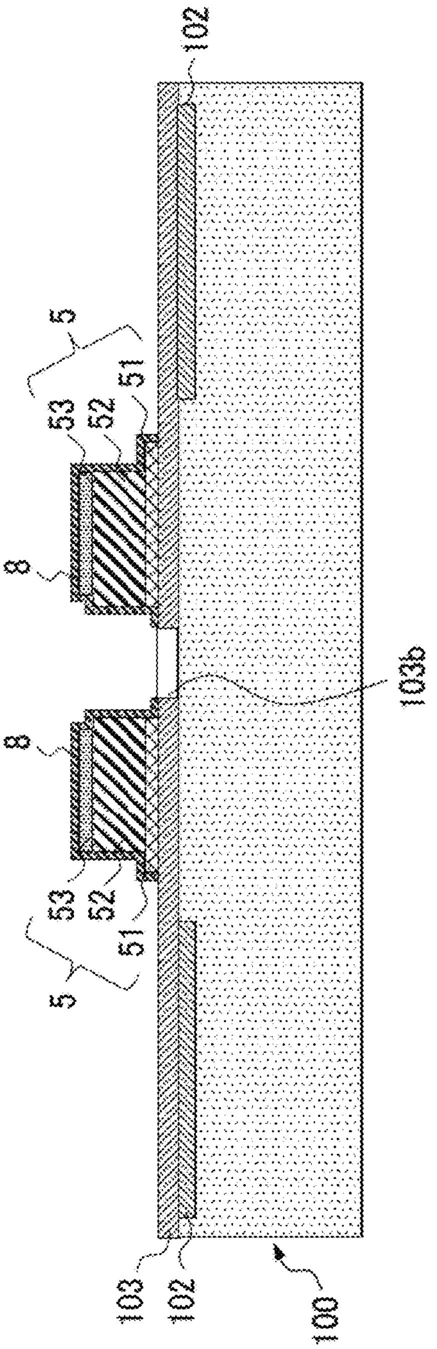

Next, as illustrated in FIGS. 25A and 25B, the first lead 9*a*, the second lead 9*b*, and the electrical connection pads 6 are formed. The first lead 9*a*, the second lead 9*b*, and the electrical connection pads 6 are typically made of Al or Al—Cu alloy. In this step, one end of the first lead 9*a* is electrically connected to the first electrode 51 through the fifth contact 7*e* of the insulating film 8, and the other end of the first lead 9*a* is electrically connected to the wiring 102 through the third contact 7*c* of the vibration film 103. One end of the second lead 9*b* is electrically connected to the second electrode 53 through the sixth contact 7*f* of the insulating film 8, and the other end of the second lead 9*b* is electrically connected to the wiring 102 through the fourth contact 7*d* of the vibration film 103. The electrical connection pads 6 are electrically connected to the wiring 102 through the first contact 7*a* and the second contact 7*b* of the vibration film 103, respectively.

Figure 26A:
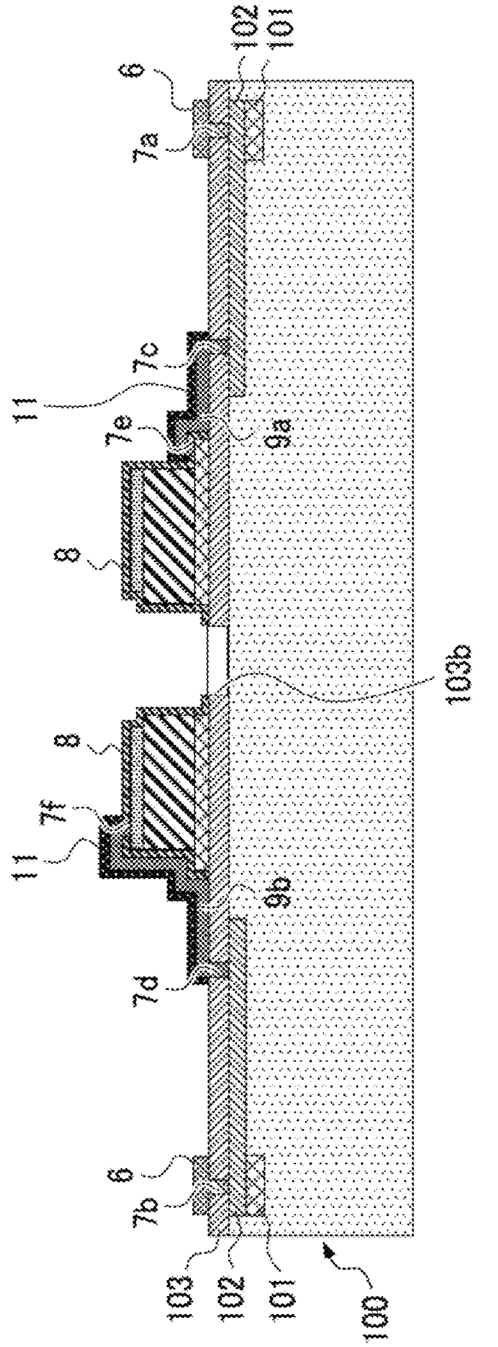
FIGS. 26A and 26B are diagrams each illustrating a process of forming the moisture-proof film of the actuator in FIG. 18.
Figure 26B:
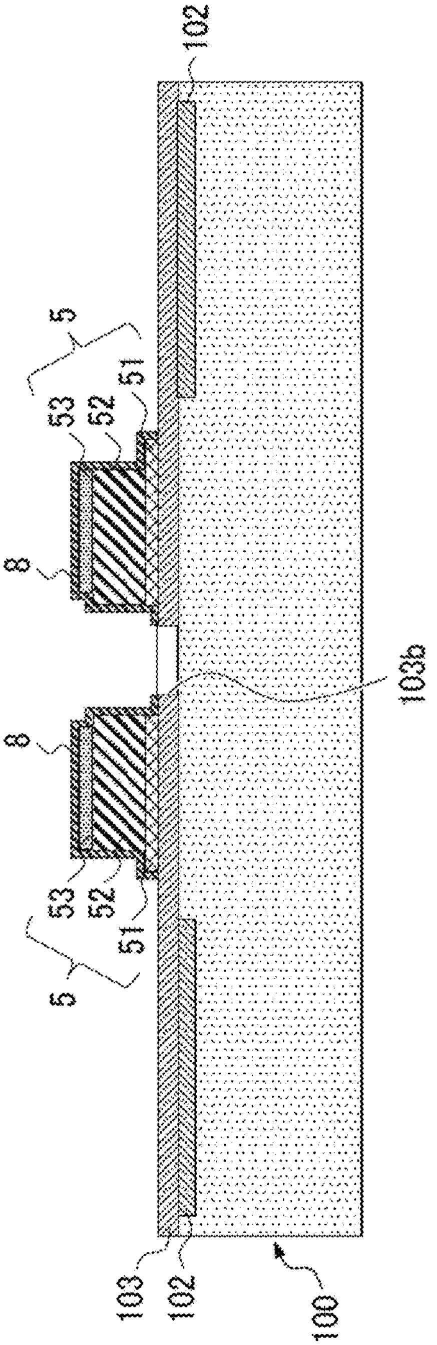

As illustrated in FIGS. 26A and 26B, the moisture-proof film 11 is formed to cover the first lead 9*a*, the second lead 9*b*, the third contact 7*c*, the fourth contact 7*d*, the fifth contact 7*e*, and the sixth contact 7*f*.

Figure 27A:
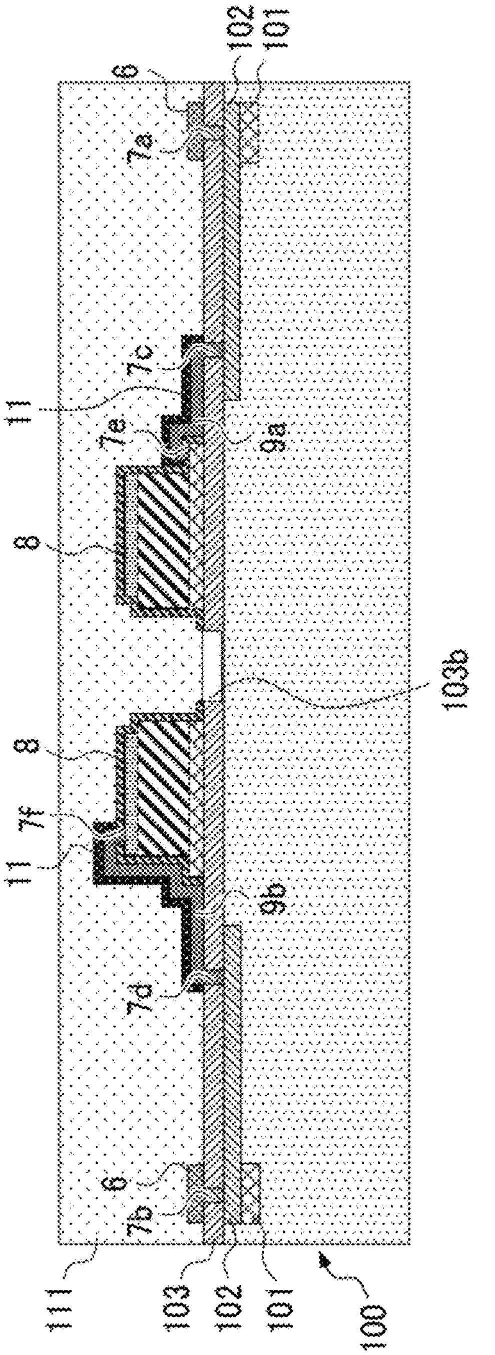
FIGS. 27A and 27B are diagrams each illustrating a process of forming a nozzle forming portion of the actuator in FIG. 18.
Figure 27B:
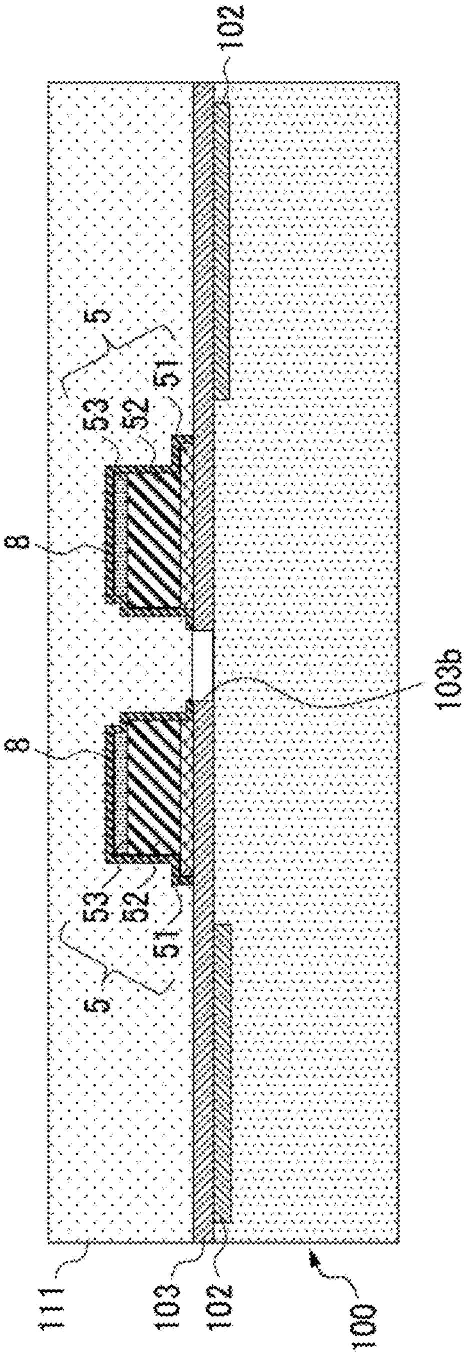

When the actuator 110 is used in the liquid discharge head, the nozzle formation portion 111 for forming the nozzle 2 is formed as illustrated in FIGS. 27A and 27B. The nozzle formation portion 111 is formed by spin coating. The material of the nozzle formation portion 111 is preferably resins that can be applied by spin coating. For example, epoxy resin SU-8 and benzocyclobutene (BCB) are preferable from the viewpoint of chemical resistance.

Figure 28A:
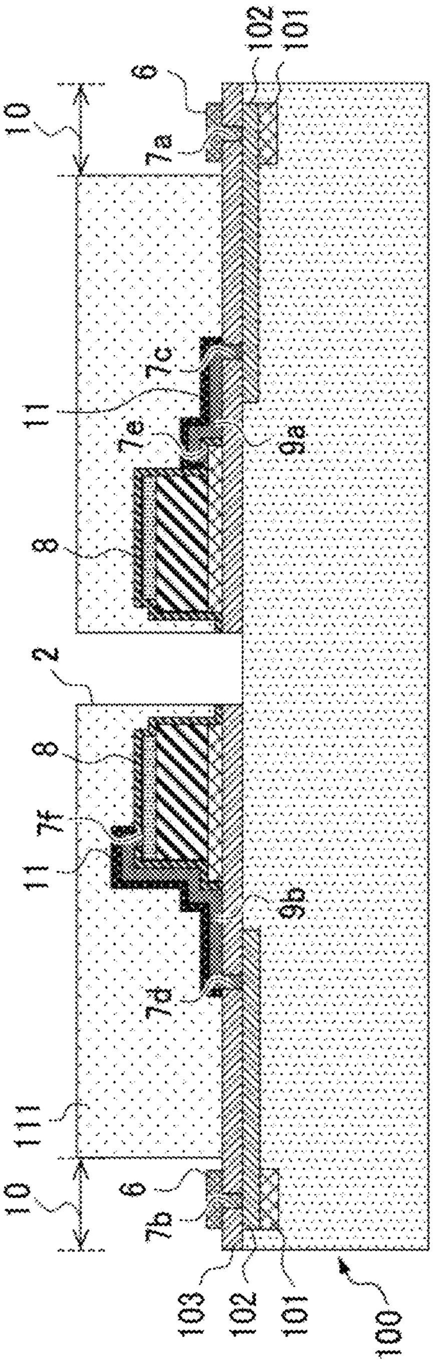
FIGS. 28A and 28B are diagrams each illustrating a process of forming a nozzle and a pad opening of the actuator in FIG. 18.
Figure 28B:
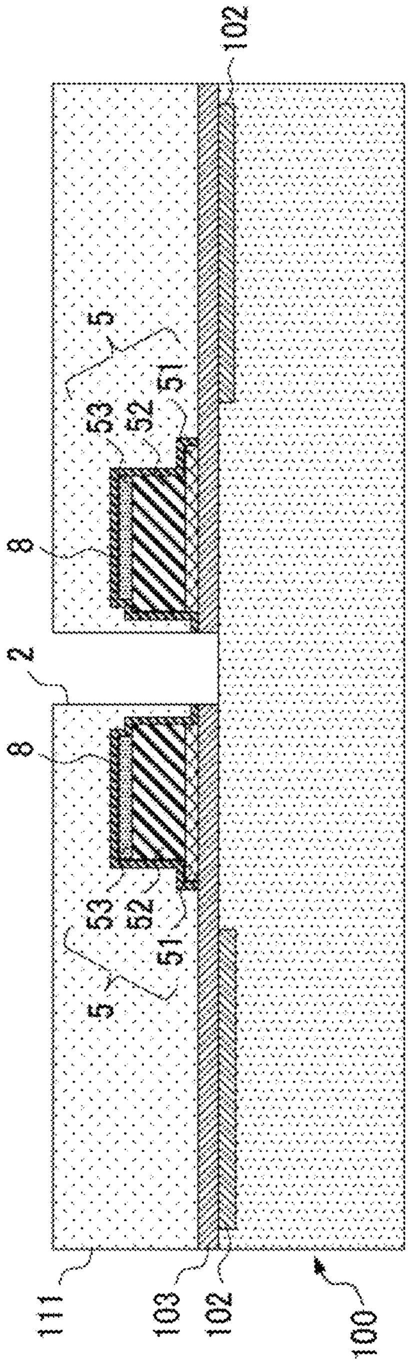

Next, as illustrated in FIGS. 28A and 28B, the nozzle 2 and the pad openings 10 are formed in the nozzle formation portion 111 by etching. The etching of the nozzle 2 and the pad openings 10 is dry etching.

Figure 29A:
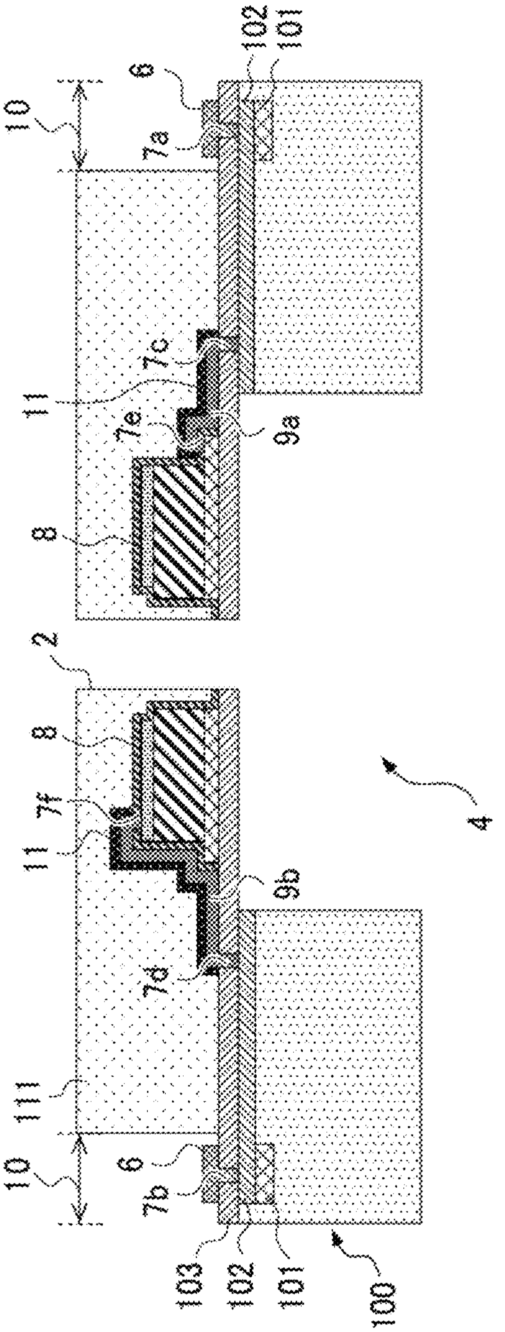
FIGS. 29A and 29B are diagrams each illustrating a process of forming a liquid chamber of the actuator in FIG. 18.
Figure 29B:
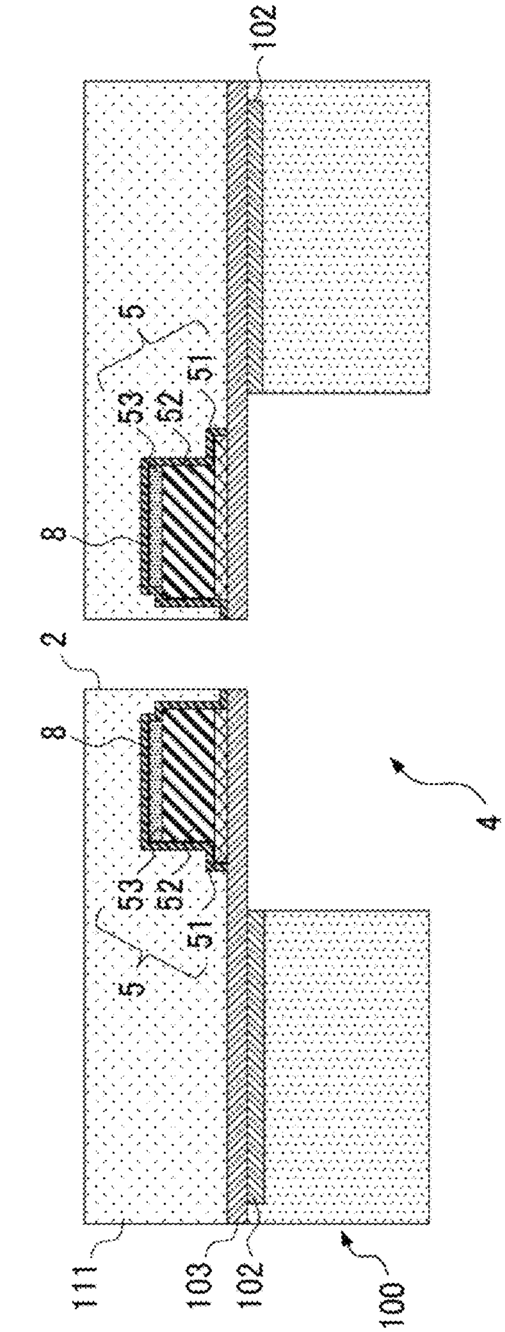

Subsequently, as illustrated in FIGS. 29A and 29B, the channel substrate 100 is processed by Si etching to form the hole-shaped void space. In the present embodiment, the void space functions as the liquid chamber 4 to store liquid. The liquid chamber 4 preferably has a high aspect ratio of cross section in order to enhance the discharge efficiency and reduce crosstalk. Specifically, the depth of the liquid chamber 4 is increased with respect to the diameter of the liquid chamber 4. For this reason, in the present embodiment, the liquid chamber 4 is formed by deep reactive ion etching (DRIE). In DRIE, a fluorocarbon (CF) based gas such as tetrafluoromethane (CF4) or octafluorocyclobutane (C4F8), or a sulfur fluoride (SF) based gas such as sulfur hexafluoride (SF6) is used as an etching gas.

As described above, also in the second embodiment, the actuator 110 can be provided that efficiently discharges liquid with a small voltage.

Configuration of Liquid Discharge Head

Figure 30A:
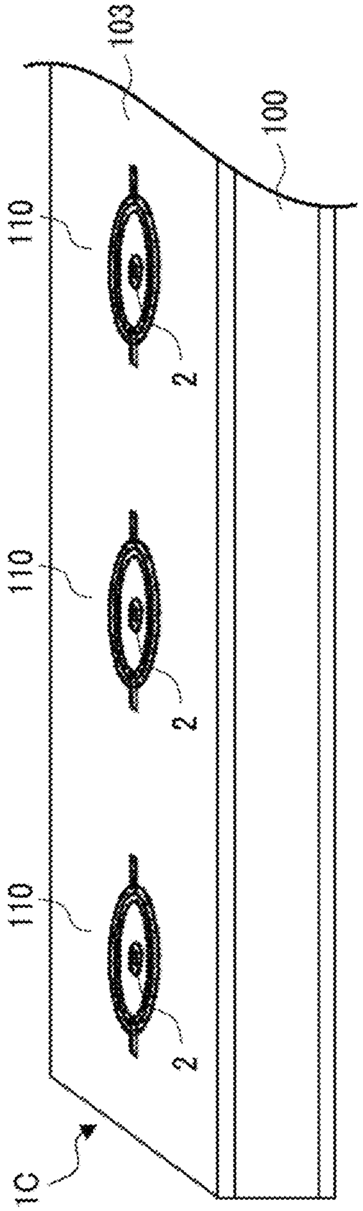
FIGS. 30A and 30B are schematic perspective views of a liquid discharge head according to another embodiment of the present disclosure.
Figure 30B:
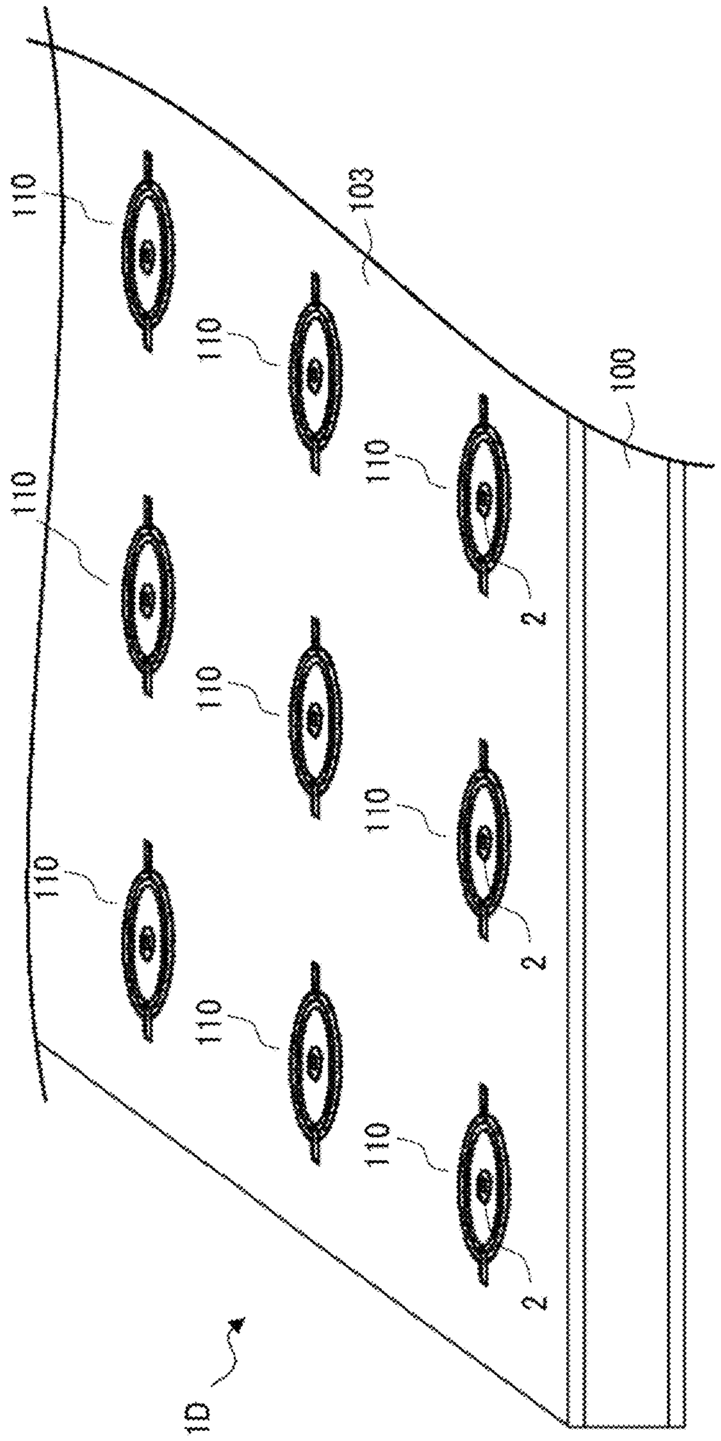

FIGS. 30A and 30B are schematic perspective views of a liquid discharge head according to another embodiment of the present disclosure. Similarly to FIG. 18, the nozzle forming portion 111 is omitted in FIG. 30 for simplicity.

The actuator 110 described above is not necessarily used as a single actuator. For example, as illustrated in FIG. 30A, a liquid discharge head 1C includes multiple actuators 110 arrayed in a row to discharge liquid from multiple nozzles 2. Alternatively, as illustrated in FIG. 30B, a liquid discharge head 1D includes multiple actuators 110 two-dimensionally arrayed in rows and columns to discharge liquid from multiple nozzles 2.

As the configuration of the liquid discharge head 1C or 1D, the multiple actuators 110, each of which is manufactured by the above-described manufacturing method, may be arranged (assembled). Alternatively, the above-described manufacturing method may be changed for multiple piezoelectric elements 5, and the multiple piezoelectric elements 5 may be simultaneously manufactured on the vibration film 103 to form an integrated configuration.

Figure 31:
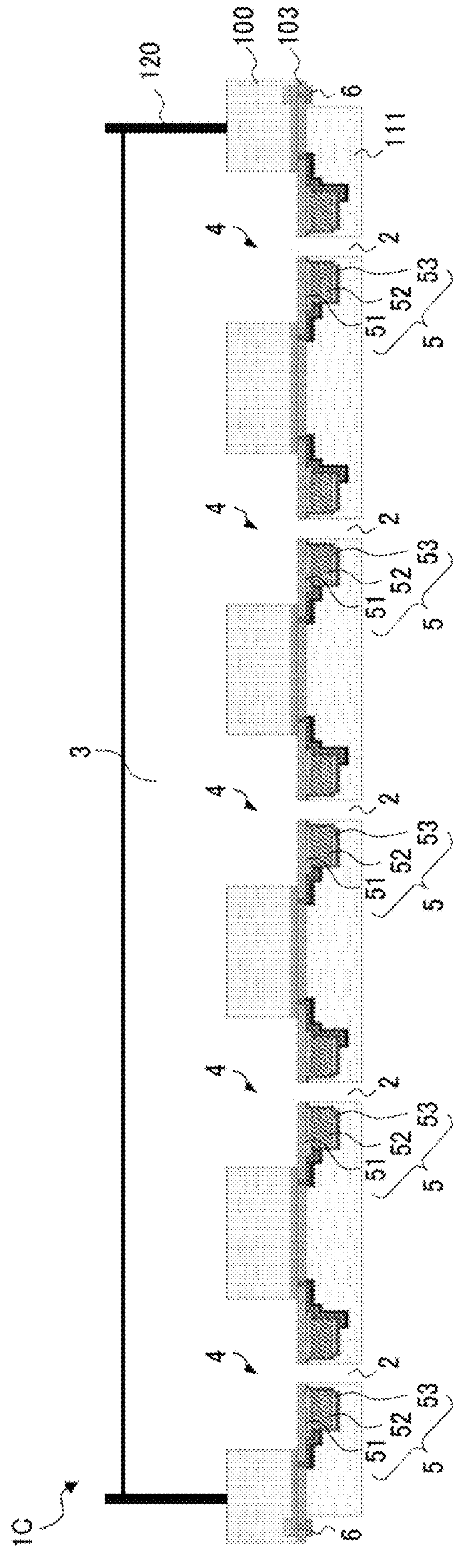
FIG. 31 is a schematic cross-sectional view of the liquid discharge head according to another embodiment of the present disclosure.

FIG. 31 is a schematic cross-sectional view of the liquid discharge head according to another embodiment of the present disclosure. The liquid discharge head 1C illustrated in FIG. 31 discharges liquid from the multiple nozzles 2 arrayed in a row. The multiple piezoelectric elements 5 corresponding to the respective nozzles 2 are simultaneously manufactured by the series of manufacturing processes described above. The multiple piezoelectric elements 5 each including the first electrode 51, the piezoelectric film 52, and the second electrode 53 is individually provided for the corresponding liquid chambers 4 (nozzles 2). The multiple piezoelectric elements 5 are electrically independent of each other, and voltages having different polarities can be applied to the piezoelectric elements 5.

The liquid discharge head 1C includes the frame component 120 bonded to the Channel substrate 100 of the actuators 110, and the common liquid chamber 3 is defined by the frame component 120. When liquid (e.g., ink) is discharged, the liquid is directly supplied from the common liquid chamber 3 to the liquid chamber 4, and the piezoelectric element 5 vibrates the nozzle face on which the nozzles 2 are arranged to discharge the liquid from the nozzles 2. The electrical connection pads 6 for connection with a power supply component such as an external power supply are disposed at both ends of the liquid discharge head 1C.

An actuator portion and a channel substrate are preferably bonded to each other with high accuracy to manufacture a typical nozzle vibration type liquid discharge head. The positional accuracy between the actuator portion and the channel substrate greatly affects liquid discharge properties.

On the other hand, in the present embodiment, films of the components are sequentially formed on the channel substrate 100 and processed by predetermined processes to form the actuator 110. Accordingly, a bonding process with high accuracy is unnecessary, and the liquid discharge head can be easily manufactured.

As described above, also in the second embodiment, a liquid discharge head having good discharge efficiency can be provided.

Modification

Figure 32:
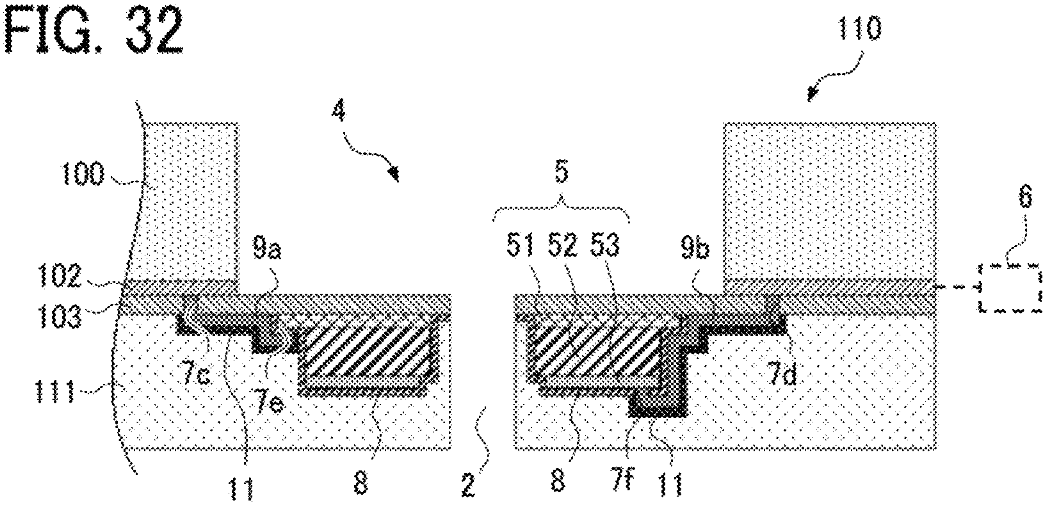
FIG. 32 is a schematic cross-sectional view of an actuator according to a modification of the above embodiment of the present disclosure.
Figure 33:
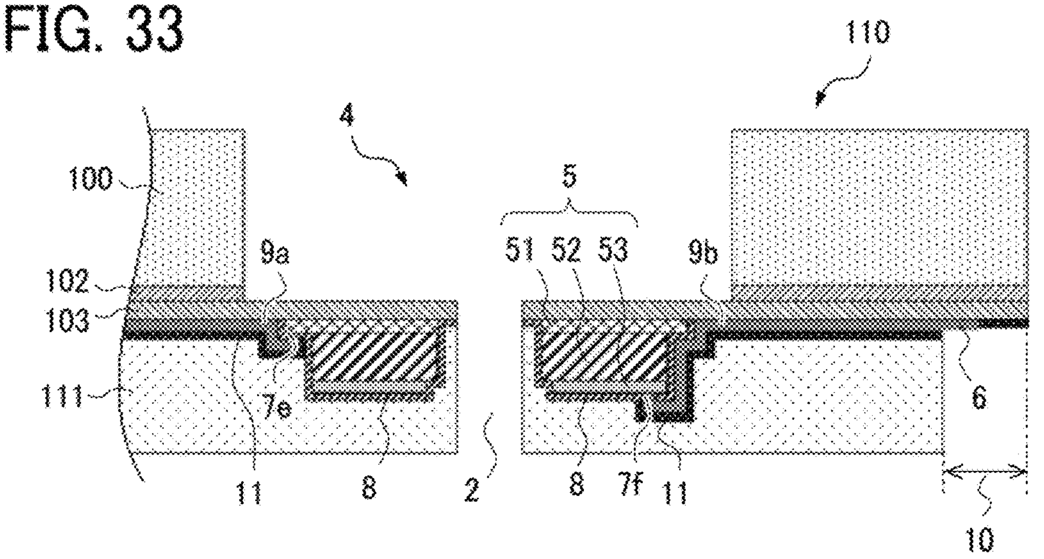
FIG. 33 is a schematic cross-sectional view of an actuator according to another modification of the above embodiment of the present disclosure.
Figure 34:
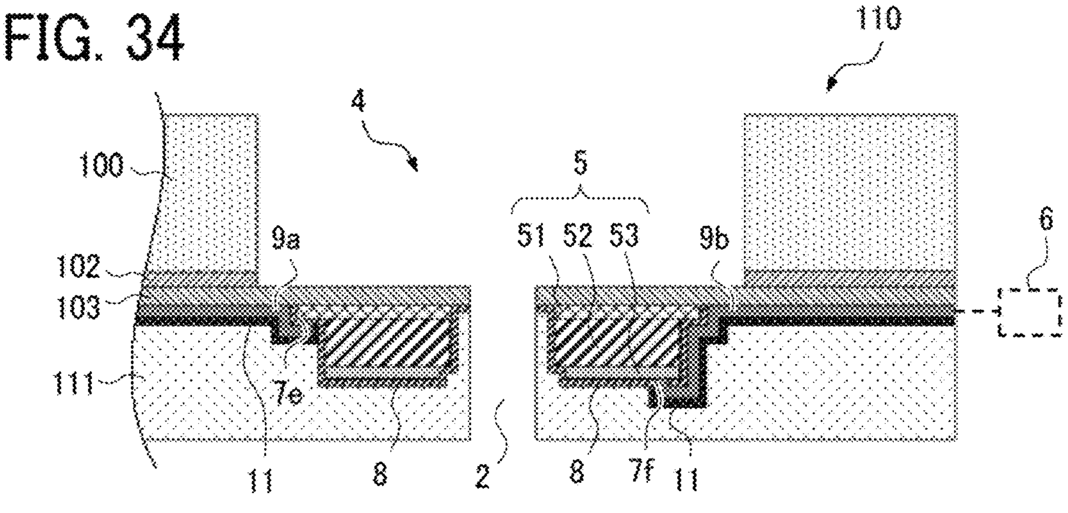
FIG. 34 is a schematic cross-sectional view of an actuator according to yet another modification of the above embodiment of the present disclosure.

An actuator according to a modification of the above embodiment of the present disclosure is described below. FIGS. 32 to 34 are schematic cross-sectional view of an actuator according to a modification of the above embodiment of the present disclosure.

The electrical connection pads 6 can have various configurations in the actuator 110. For example, as illustrated in FIG. 32, the wiring 102 of the channel substrate 100 may be extended to the side face of the actuator 110, and the end of the wiring 102 may be electrically connected to the electrical connection pad 6, which is connected to an electrical component such as an external power supply, disposed outside the actuator 110. As illustrated in FIG. 32, the channel substrate 100 may not include the drive circuit 101.

As illustrated in FIG. 33, one end of each of the first lead 9*a* and the second lead 9*b* may be exposed to the outside of the actuator 110, and the exposed end may serve as the electrical connection pad 6. Also in this case, the channel substrate 100 may not include the drive circuit 101.

As illustrated in FIG. 34, one end of each of the first lead 9*a* and the second lead 9*b* may be extended to a side face of the actuator 110, and the electrical connection pad 6 may be electrically connected to the end of each of the first lead 9*a* and the second lead 9*b*. Also in this case, the channel substrate 100 may not include the drive circuit 101.

Liquid Discharge Apparatus

A liquid discharge apparatus according to embodiments of the present disclosure is described below.

Line Printer

Figure 35:
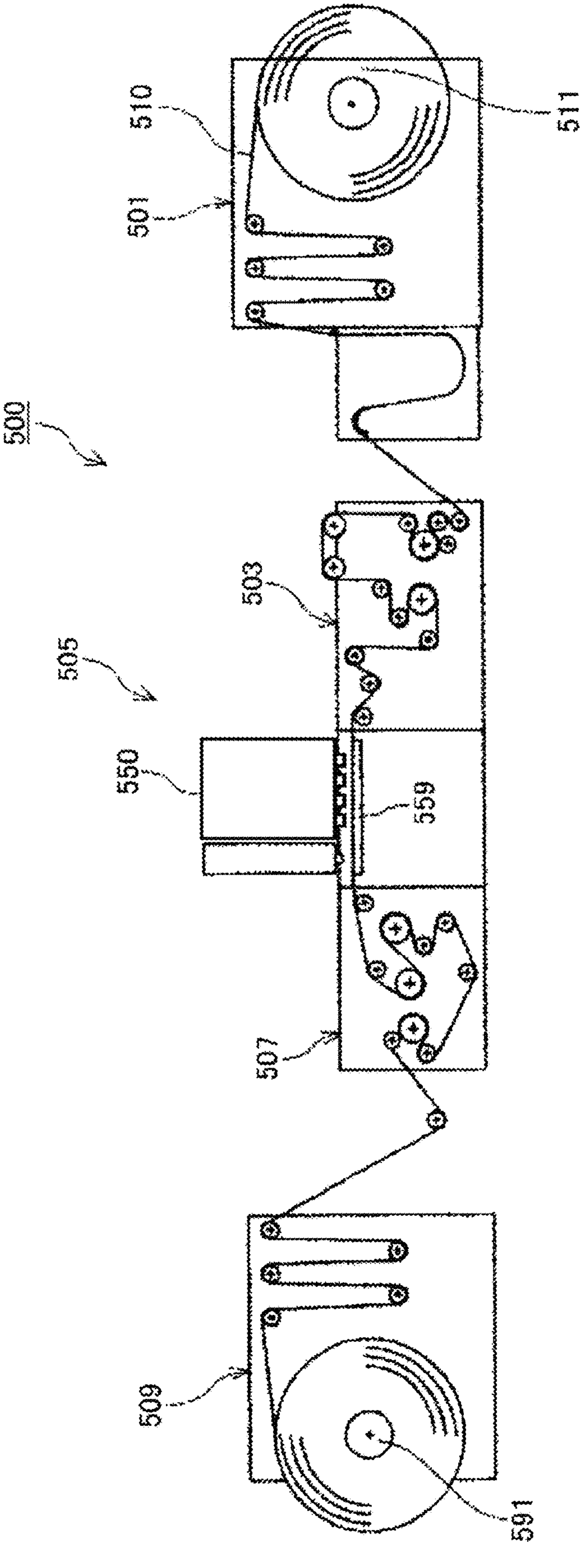
FIG. 35 is a schematic diagram illustrating a configuration of a printer as a liquid discharge apparatus according to embodiments of the present disclosure.
Figure 36:
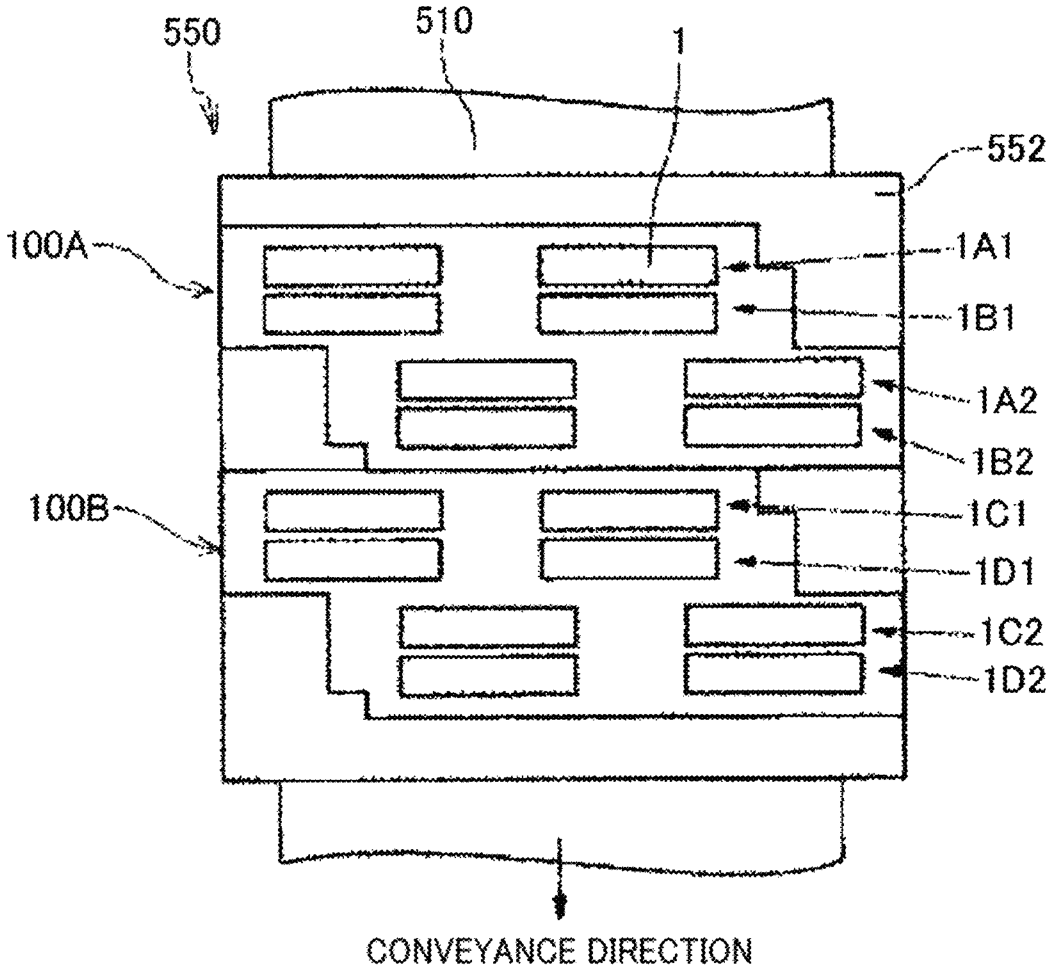
FIG. 36 is a plan view of a head unit of the printer illustrated in FIG. 35.

FIG. 35 is a schematic diagram of a printer 500 as the liquid discharge apparatus that discharges a liquid, according to an embodiment of the present disclosure, and FIG. 36 is a plan view of a head unit 550 of the printer 500 according to the present embodiment.

The printer 500 as the liquid discharge apparatus includes a feeder 501 to feed a continuous medium 510, which is a continuous long recording medium, to a printing unit 505 and a guide conveyor 503 to guide and convey the continuous medium 510, fed from the feeder 501, to the printing unit 505. The printer 500 further includes the printing unit 505 to discharge a liquid onto the continuous medium 510 to form, for example, an image on the continuous medium 510, a dryer 507 to dry the continuous medium 510, and an ejector 509 to eject the dried continuous medium 510.

The continuous medium 510 is fed from a feed roller 511 of the feeder 501, guided and conveyed with rollers of the feeder 501, the guide conveyor 503, the dryer 507, and the ejector 509, and wound around a rewind roller 591 of the ejector 509. In the printing unit 505, the continuous medium 510 is conveyed on a conveyance guide 559 so as to face the head unit 550. The head unit 550 discharges a liquid onto the continuous medium 510 to form, for example, an image.

In the printer 500 according to the present embodiment, the head unit 550 includes a common base 552 on which two head modules 100A and 100B are mounted as illustrated in FIG. 36. In the present embodiment, in each of the head modules 100A and 100B, multiple liquid discharge heads 1 are arranged in a direction orthogonal to a conveyance direction of the continuous medium 510 to construct a line head (also referred to as a full-width head).

The head module 100A includes head arrays 1A1, 1B1, 1A2, and 1B2. Each of the head arrays 1A1, 1B1, 1A2, and 1B2 includes multiple liquid discharge heads 1 arranged in a head array direction perpendicular to a conveyance direction of the continuous medium 510. The head module 100B includes head arrays 1C1, 1D1, 1C2, and 1D2. Each of the head arrays 1C1, 1D1, 1C2, and 1D2 includes multiple liquid discharge heads 1 arranged in the head array direction. The head arrays 1A1 and 1A2 of the head module 100A discharge a liquid of the same color. Similarly, the head arrays 1B1 and 1B2 of the head module 100A are grouped as one set and discharge a liquid of the same desired color. The head arrays 1C1 and 1C2 of the head module 100B are grouped as one set and discharge a liquid of the same desired color. The head arrays 1D1 and 1D2 of the head module 100B are grouped as one set and discharge a liquid of the same desired color. The liquid discharge head 1 including the actuator 110 described above is used in the head arrays 1A1 to 1D2.

Serial Printer

Figure 37:
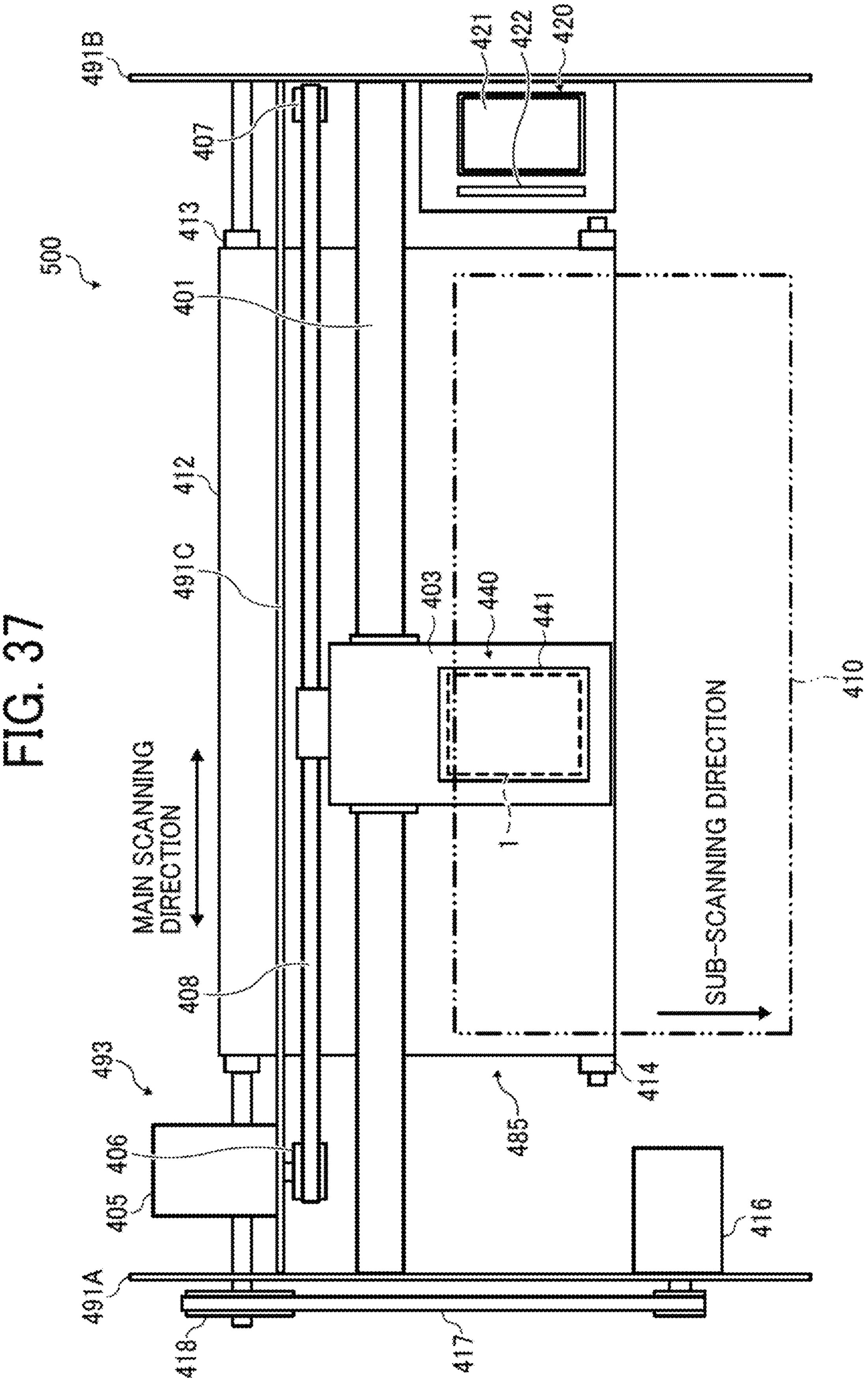
FIG. 37 is a plan view of another printer as a liquid discharge apparatus according to embodiments of the present disclosure.
Figure 38:
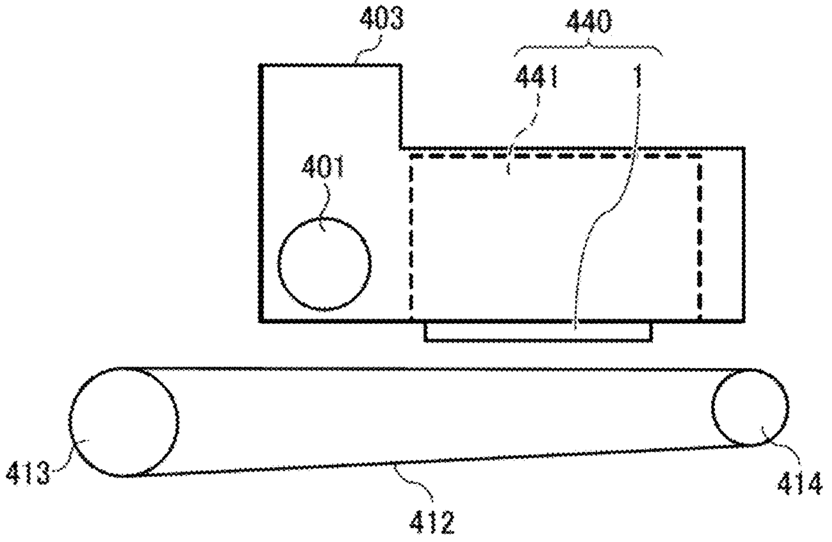
FIG. 38 is a side view of the printer illustrated in FIG. 37.

FIG. 37 is a plan view of another printer 500 as a liquid discharging apparatus according to embodiments of the present disclosure. FIG. 38 is a side view of the printer 500 in FIG. 37.

In the present embodiment, the printer 500 is a serial type apparatus, and a main-scanning moving mechanism 493 reciprocally moves a carriage 403 in a main scanning direction. The main-scanning moving mechanism 493 includes, for example, a guide 401, a main-scanning motor 405, and a timing belt 408. The guide 401 is bridged between left and right side plates 491A and 491B to moveably hold the carriage 403. The main-scanning motor 405 reciprocates the carriage 403 in the main scanning direction via the timing belt 408 looped around a drive pulley 406 and a driven pulley 407.

The carriage 403 mounts a liquid discharge unit 440 including the liquid discharge head 1 and a head tank 441 as a single integrated unit. The liquid discharge head 1 includes the actuator 110 described above.

The liquid discharge head 1 discharges color liquids of, for example, yellow (Y), cyan (C), magenta (M), and black (K). The liquid discharge head 1 is mounted on the liquid discharge unit 440 such that a nozzle row including the multiple nozzles 2 is arranged in a sub-scanning direction perpendicular to the main scanning direction. The liquid discharge head 1 discharges the color liquid downward from the multiple nozzles 2. The liquid discharge head 1 is coupled to a liquid circulation device so that a liquid of a desired color is circulated and supplied.

The printer 500 includes a conveyance mechanism 485 to convey a sheet 410 as a recording medium. The conveyance mechanism 485 includes a conveyance belt 412 as a conveyor and a sub-scanning motor 416 to drive the conveyance belt 412. The conveyance belt 412 attracts the sheet 410 and conveys the sheet 410 to a position facing the liquid discharge head 1. The conveyance belt 412 is an endless belt and is stretched between a conveyance roller 413 and a tension roller 414. The sheet 410 can be attracted to the conveyance belt 412 by, for example, electrostatic attraction or air suction. The conveyance roller 413 is driven and rotated by the sub-scanning motor 416 via a timing belt 417 and a timing pulley 418, so that the conveyance belt 412 circulates in sub-scanning direction.

On one end of the range of movement of the carriage 403 in the main scanning direction, a maintenance mechanism 420 that maintains and recovers the liquid discharge head 1 is disposed lateral to the conveyance belt 412. The maintenance mechanism 420 includes, for example, a cap 421 to cap the nozzle face of the liquid discharge head 1 and a wiper 422 to wipe the nozzle face. The main-scanning moving mechanism 493, the maintenance mechanism 420, and the conveyance mechanism 485 are mounted onto a housing including the side plates 491A and 491B and a back plate 491C.

In the printer 500 having the above-described configuration, the sheet 410 is fed and attracted onto the conveyance belt 412 and conveyed in the sub-scanning direction by the circumferential movement of the conveyance belt 412. The liquid discharge head 1 is driven in response to an image signal while the carriage 403 moves in the main scanning direction to discharge a liquid onto the sheet 410 not in motion to form, for example, an image.

Liquid Discharge Unit

Figure 39:
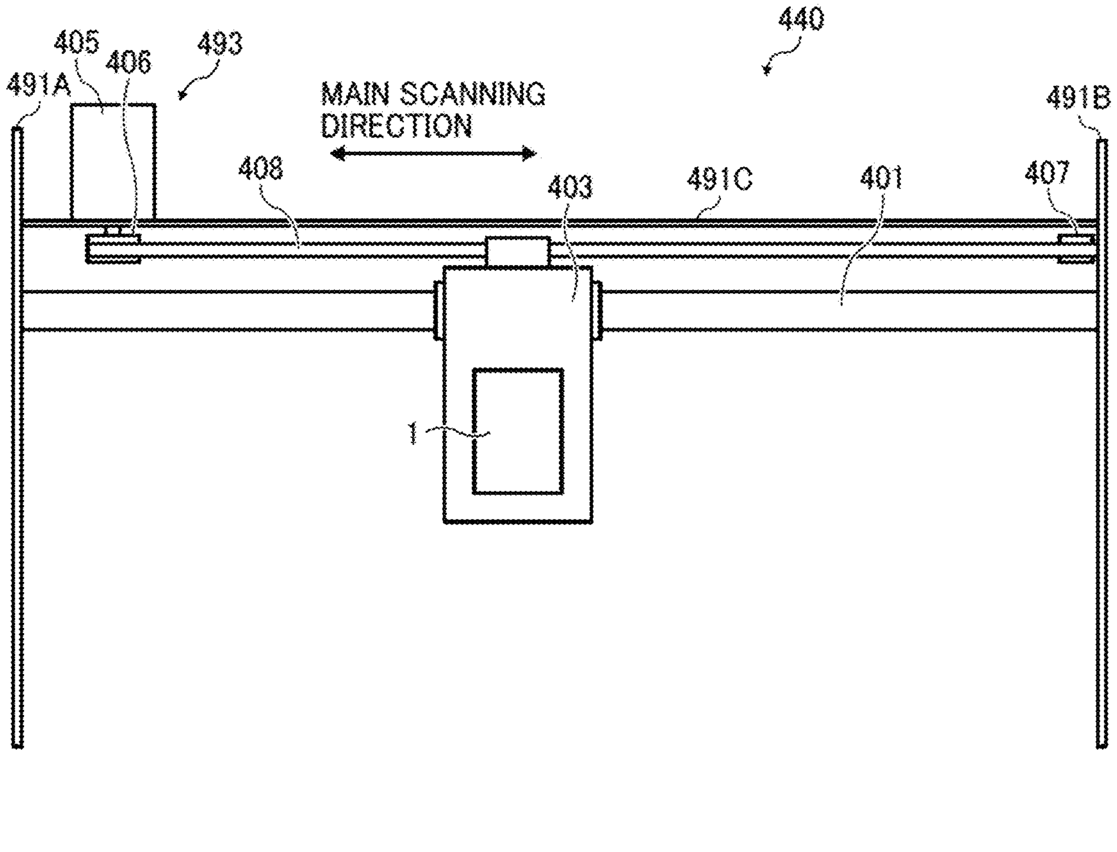
FIG. 39 is a plan view of a liquid discharge unit according to embodiments of the present disclosure.

The liquid discharge unit 440 according to the present embodiment is described below. FIG. 39 is a plan view of a part of the liquid discharge unit 440 according to the present embodiment.

The liquid discharge unit 440 includes the housing, the main-scanning moving mechanism 493, the carriage 403, and the liquid discharge head 1 among components of the printer 500 as the liquid discharge apparatus illustrated in FIGS. 37 and 38. The side plates 491A and 491B, and the back plate 491C construct the housing. In the liquid discharge unit 440, the maintenance mechanism 420 described above may be mounted on, for example, the side plate 491B.

Figure 40:
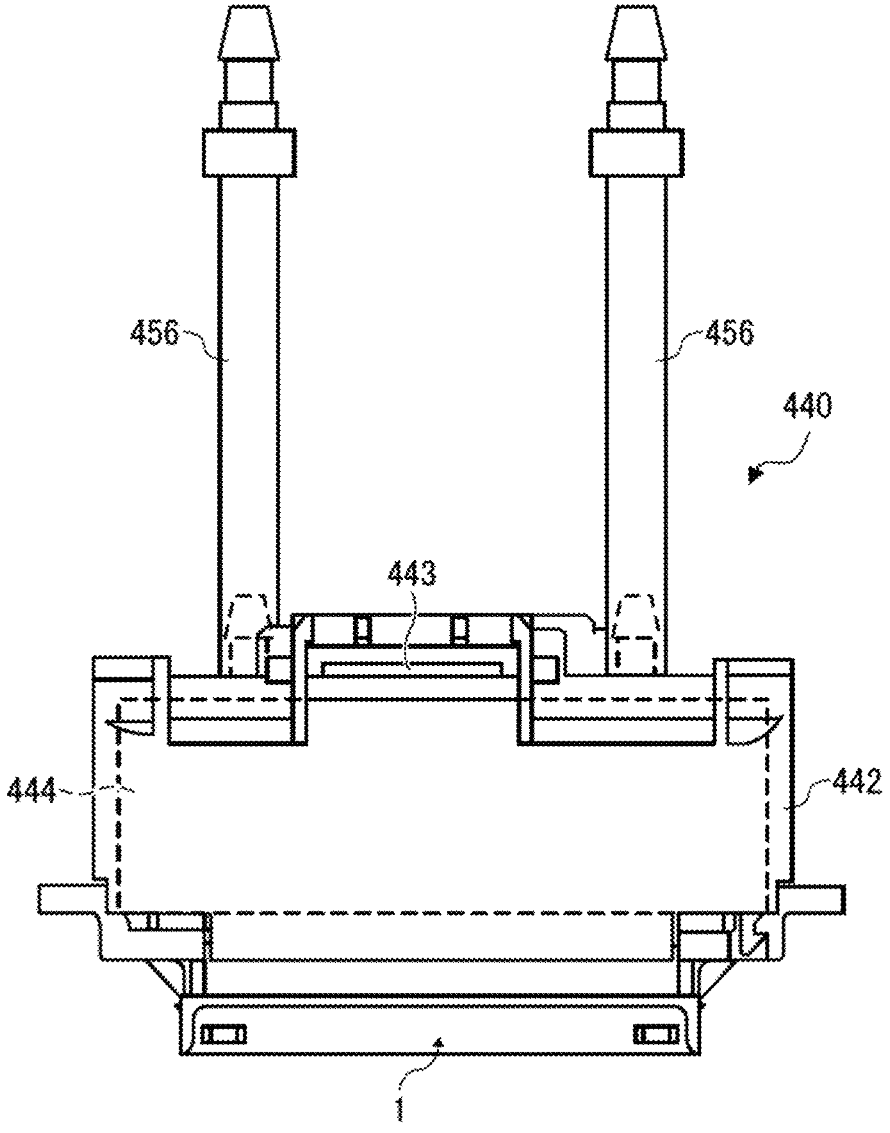
FIG. 40 is a front view of another liquid discharge unit according to embodiments of the present disclosure.

FIG. 40 is a front view of another liquid discharge unit 440 according to the present embodiment. The liquid discharge unit 440 includes the liquid discharge head 1 to which a channel component 444 is attached, and a tube 456 connected to the channel component 444. The channel component 444 is disposed inside a cover 442. Alternatively, the liquid discharge unit 440 may include the head tank 441 instead of the channel component 444. A connector 443 for electrically connecting to the liquid discharge head 1 is provided on an upper portion of the channel component 444.

Applied Case

An applied case of the actuator is described below. The actuator according to the embodiment is not limited to an apparatus that discharges liquid, and, for example, may be used for emitting ultrasonic waves. An ultrasonic diagnostic apparatus to which the actuator according to the above embodiments is applied is described below.

Figure 41:
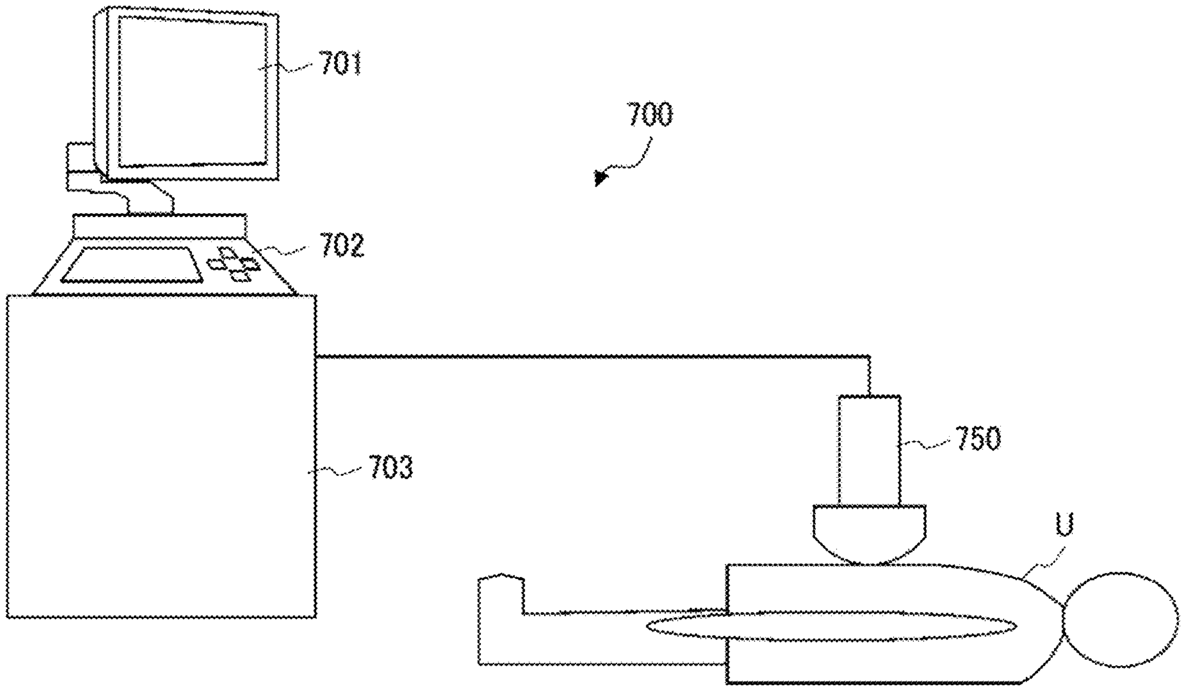
FIG. 41 is a schematic view of an ultrasonic diagnostic apparatus to which the actuator according to embodiments of the present disclosure is applied.

FIG. 41 is a schematic view of an ultrasonic diagnostic apparatus 700 to which the actuator according to the above embodiments is applied. The ultrasonic diagnostic apparatus 700 includes an ultrasonic probe 750. The ultrasonic probe 750 emits ultrasonic waves toward a measurement target U and detects vibration of the ultrasonic waves reflected by the measurement target U. The ultrasonic diagnostic apparatus 700 also includes a display 701 that visualizes and displays a signal from the ultrasonic probe 750, a control panel 702, and a controller 703 that controls the ultrasonic probe 750.

Typically, the controller 703 includes an ultrasonic pulse generator, a converter, and an ultrasonic image forming unit. The ultrasonic pulse generator generates a pulsed electrical signal for generating an ultrasonic signal. The converter converts an echo signal received from the ultrasonic probe 750 into an electrical signal. The ultrasonic image forming unit generates a two-dimensional or three-dimensional ultrasonic image, or various Doppler images from echo signals.

The display 701 is, for example, a liquid crystal display (LCD) or a monitoring device and displays an image generated by the controller 703. The control panel 702 is an input device for an operator to input, for example, parameters so as to appropriately diagnose the measurement target U. The control panel 62 may include, for example, a push button and a touch panel.

The ultrasonic probe 750 is electrically connected to the controller 703 via, for example, a cable. The ultrasonic probe 750 emits the ultrasonic signal toward the measurement target U which is a human body or an object and receives the ultrasonic signal reflected as an echo from the measurement target U. Thus, the ultrasonic diagnostic apparatus 700 can visualize an inside of the measurement target U and diagnosis the inside by emitting and receiving an ultrasonic signal.

Figure 42:
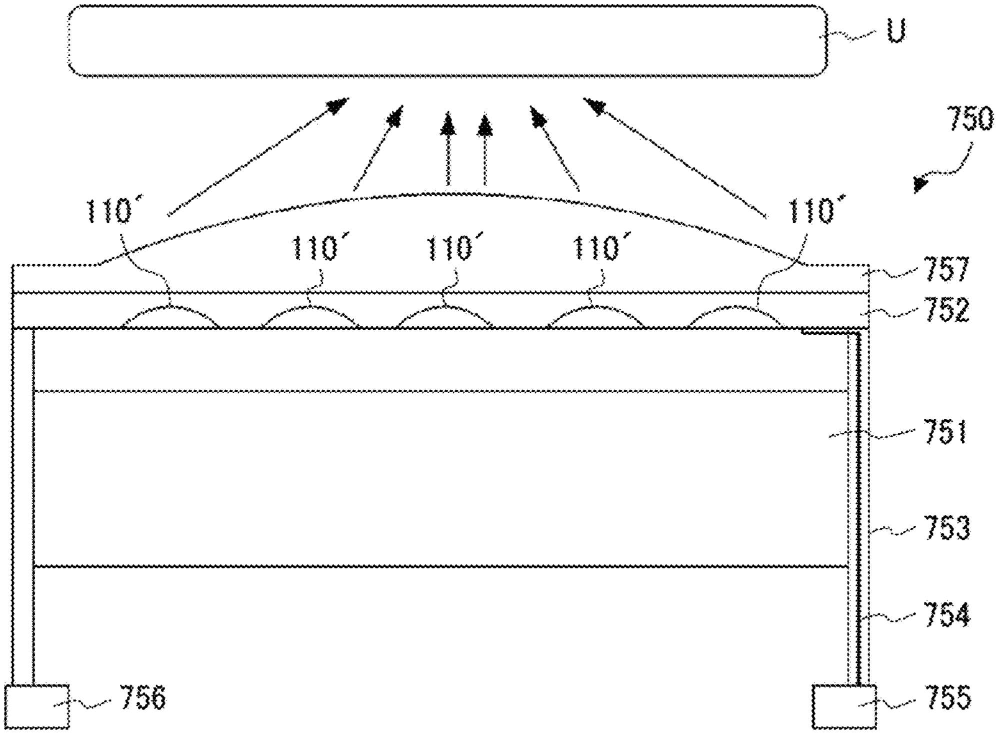
FIG. 42 is a schematic diagram illustrating a configuration of an ultrasonic probe of the ultrasonic diagnostic apparatus illustrated in FIG. 41.

FIG. 42 is a schematic diagram illustrating a configuration of the ultrasonic probe 750 of the ultrasonic diagnostic apparatus 700 illustrated in FIG. 41. The ultrasonic probe 750 includes a support board 751, a piezoelectric micro-machined ultrasonic transducer (PMUT) chip 752 which is an ultrasonic transducer disposed on the support board 751, a flexible printed board 753, a wiring 754, connectors 755 and 756, and an acoustic lens 757. The PMUT chip 752 is electrically connected to the connectors 755 and 756 via the flexible printed board 753 and the wiring 754, and the connectors 755 and 756 are connected to the controller 703 via a circuit board. The support board 751 functions as a backing plate to support the PMUT chip 752.

The acoustic lens 757 is made of silicon resin and used for focusing the ultrasonic waves emitted from the PMUT chip 752 on the measurement position of the measurement target U. The acoustic lens 757 has a so-called dome shape in which the central portion is thicker than the peripheral portion. The acoustic lens 757 tightly contacts the measurement target U and deflects the ultrasonic waves in a pseudo manner due to the difference in thickness between the central portion and the peripheral portion to focus the ultrasonic waves. The acoustic lens 757 has a function of focusing ultrasonic waves in at least one direction and does not necessarily focus the ultrasonic waves to one point. The acoustic lens 757 and the PMUT chip 752 are bonded to each other by, for example, an adhesive.

Figure 43:
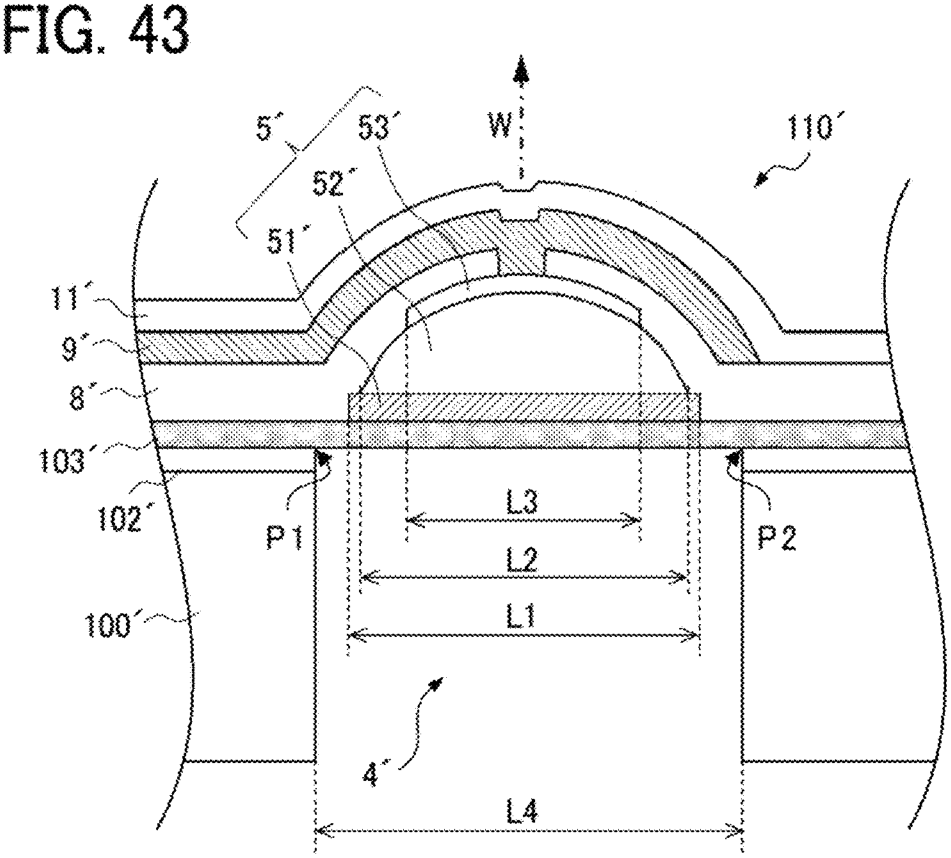
FIG. 43 is a cross-sectional view of the actuator in the ultrasonic probe illustrated in FIG. 42.

The PMUT chip 752 includes the array of multiple actuators 110'. The actuator 110' is described below in detail. FIG. 43 is a cross-sectional view of the actuator 110' in the ultrasonic probe 750 illustrated in FIG. 42. In FIG. 43, components having functions equivalent to those of the components of the actuator 110 illustrated in the first and second embodiments are denoted by the same reference numerals with a prime (').

The actuator 110' includes a silicon substrate 100', a wiring 102', a vibration film 103', a piezoelectric element 5', an insulating film 8', a lead 9', and a protective film (moisture-proof film) 11'. A void space 4', which is an opening having, for example, a cylindrical shape, is formed in the silicon substrate 100', and a wiring 102' is laminated over the silicon substrate 100'. The wiring 102' is formed over the silicon substrate 100' and includes a wiring for applying a voltage to a first electrode 51' and a wiring for applying a voltage to a second electrode 53'. A vibration film 103' is laminated over the wiring 102'.

The vibration film 103' is formed over the wiring 102'. As the vibration film 103' receives vibrations from the piezoelectric element 5', the vibration film 103' is displaced in the vertical direction in FIG. 43. The piezoelectric element 5' over the vibration film 103' includes the first electrode 51', a piezoelectric body 52', and the second electrode 53'. The first electrode 51' may be referred to as a lower electrode, and the second electrode 53' may be referred to as an upper electrode.

The first electrode 51' has a width L1 (outer diameter) which is smaller than a width L4 (inner diameter) of the void space 4' formed in the silicon substrate 100', and has an outer shape that fits within an outer shape of the void space 4'. The second electrode 53' is formed along a dome-shaped upper face of the piezoelectric body 52'.

A width L3 (outer diameter) of the second electrode 53' is preferably smaller than a width L2 (outer diameter) of the piezoelectric body 52'. In particular, when the piezoelectric body 52' has a dome shape, the width L3 of the second electrode 53' is smaller than the outer shape of the piezoelectric body 52'. As a result, a short circuit between the second electrode 53' and the first electrode 51' can be prevented.

The insulating film 8' prevents a short circuit between the first electrode 51' and the second electrode 53' and a short circuit between the lead 9' and the first electrode 51'. In the present embodiment, the piezoelectric body 52' has, but not limited to, the dome shape. The shape of the piezoelectric body 52' may be a shape other than the dome shape, such as a cylindrical shape.

With the above-described configuration, the piezoelectric body 52' is mechanically deformed by application of a drive voltage between the first electrode 51' and the second electrode 53'. By causing periodic fluctuations in the drive voltage, vibrations of a predetermined frequency can be generated. As a result, the vibration film 103' is vibrated to generate ultrasonic waves W.

Further, as ultrasonic waves vibrate the piezoelectric body 52', the piezoelectric body 52' is polarized to generate a potential difference between the first electrode 51' and the second electrode 53'. Thus, the actuator 110' also functions as a detector to detect the vibrations as an electrical signal. As described above, the actuator 110' functions as an electromechanical transducer element that periodically expands and contracts the piezoelectric body 52' by a potential difference, which is an electrical signal, between the first electrode 51' and the second electrode 53', to generate vibrations. In particular in the present embodiment, the actuator 110' functions as an ultrasonic transducer that generates a sound wave in an ultrasonic range with such vibrations.

In the actuator 110' having the above-described configuration, portions of the vibration film 103' near the fixed ends P1 and P2 are easily movable since the first electrode 51' has an outer shape that fits within an outer shape of the void space 4'. As a result, the vibration film 103' can be sufficiently vibrated. The deformation efficiency of the vibration film 103' with respect to voltage increases, and the responsiveness to high frequency is not reduced.

In embodiments of the present disclosure, the term "liquid discharge apparatus" includes a liquid discharge head and drives the liquid discharge head to discharge liquid. The liquid discharge apparatus may be, for example, any apparatus that can discharge liquid to a material onto which liquid can adhere or any apparatus to discharge liquid toward gas or into liquid.

The "liquid discharge apparatus" may further include devices relating to feeding, conveying, and ejecting of the material onto which liquid can adhere and also include, for example, a pretreatment device and an aftertreatment device. The "liquid discharge apparatus" may be, for example, an image forming apparatus to form an image on a sheet by discharging ink, or a three-dimensional apparatus to discharge fabrication liquid to a powder layer in which powder material is formed in layers, so as to form a three-dimensional object.

The "liquid discharge apparatus" is not limited to an apparatus that discharges liquid to visualize meaningful images such as letters or figures. For example, the liquid discharge apparatus may be an apparatus that forms meaningless images such as meaningless patterns or an apparatus that fabricates three-dimensional images.

The above-described term "material onto which liquid can adhere" represents a material on which liquid is at least temporarily adhered, a material on which liquid is adhered and fixed, or a material into which liquid is adhered to permeate. Specific examples of the "material onto which liquid can adhere" include, but are not limited to, a recording medium such as a paper sheet, recording paper, a recording sheet of paper, a film, or cloth, an electronic component such as an electronic substrate or a piezoelectric element, and a medium such as layered powder, an organ model, or a testing cell. The "material onto which liquid can adhere" includes any material to which liquid adheres, unless particularly limited.

Examples of the "material onto which liquid can adhere" include any materials to which liquid can adhere even temporarily, such as paper, thread, fiber, fabric, leather, metal, plastic, glass, wood, ceramic, a current collector such as an aluminum foil or a copper foil, and an electrode in which an active material layer is formed on the current collector.

Further, the term "liquid" is not limited to a particular liquid and includes any liquid having a viscosity or a surface tension that can be discharged from the head. However, preferably, the viscosity of the liquid is not greater than 30 mPa·s under ordinary temperature and ordinary pressure or by heating or cooling. Examples of the liquid include a solution, a suspension, or an emulsion that contains, for example, a solvent, such as water or an organic solvent; a colorant, such as dye or pigment; a functional material, such as a polymerizable compound, a resin, or a surfactant; a biocompatible material, such as DNA, amino acid, protein, or calcium; an edible material, such as a natural colorant; an active material and a solid electrolyte used as an electrode material; or ink containing a conductive material or an insulating material. Such a solution, a suspension, or an emulsion can be used for, e.g., inkjet ink, surface treatment solution, a liquid for forming components of electronic element or light-emitting element or a resist pattern of electronic circuit, a material solution for three-dimensional fabrication, an electrode, or an electrochemical element.

The liquid discharge apparatus may be an apparatus to relatively move the liquid discharge head and the material onto which liquid can adhere. However, the liquid discharge apparatus is not limited to such an apparatus. For example, the liquid discharge apparatus may be a serial head apparatus that moves the liquid discharge head or a line head apparatus that does not move the liquid discharge head.

Examples of the "liquid discharge apparatus" further include: a treatment liquid applying apparatus that discharges a treatment liquid onto a sheet to apply the treatment liquid to the surface of the sheet to reform the surface of the sheet; and an injection granulation apparatus that injects a composition liquid, in which a raw material is dispersed in a solution, through a nozzle to granulate fine particle of the raw material.

The "liquid discharge apparatus" is not limited to a stationary apparatus. The liquid discharge apparatus may be, for example, a robot which is equipped with a liquid discharge head and movable by remote control or autonomous driving. The movable robot can paint an outer wall of a building and paint a road marking (e.g., a crosswalk, a stop line, and a speed limit) on a road. In this case, a building and a road are also included in the "material onto which liquid can adhere."

The above-described embodiments of the present disclosure are examples, and the following aspects of the present disclosure can provide, for example, advantageous effects described below.

Aspect 1

According to Aspect 1, an actuator (e.g., the actuator 110) includes a substrate (e.g., the channel substrate 100), a vibration film (e.g., the vibration film 103), a piezoelectric element (e.g., the piezoelectric element 5). A void space (e.g., the liquid chamber 4 or the void space 4') is formed in the substrate. The void space is a storage space for a medium on which the vibration film acts, such as ink in the liquid chamber 4 and ultrasonic gas stored in the void space 4'. The vibration film is laminated over the substrate. The vibration film serves as a part of a wall of the void space. The piezoelectric element is laminated over the vibration film and is opposed to the void space. The piezoelectric element has an outer shape (e.g., the width L1) that fits within the void space (e.g., the width L3) at least at a portion laminated over the vibration film 103. In other words, an actuator includes a substrate, a vibration film, and a piezoelectric element. The substrate has a void space having a first width, defined by opposed inner walls, in a width direction. The vibration film is disposed over the substrate in a lamination direction perpendicular to the width direction. The vibration film serves as a part of a wall of the void space. The piezoelectric element is disposed over the vibration film in the lamination direction. The piezoelectric element is opposed to the void space of the substrate via the vibration film. The piezoelectric element has a second width smaller than the first width in the width direction. The piezoelectric element has outer ends, defining the second width, within the opposed inner walls of the void space in the width direction.

Aspect 2

According to Aspect 2, in Aspect 1, the piezoelectric element is laminated over the side of the vibration film opposite to the side serving as the part of the wall of the void space. In other words, the void space has a circular shape, having a first area, in a plane of the substrate, and the piezoelectric element has a circular shape, having a second area smaller than the first area, in a plane of the substrate.

Aspect 3

According to Aspect 3, in Aspect 1 or 2, the piezoelectric element includes a first electrode (e.g., the first electrode 51) over the vibration film, a piezoelectric film (e.g., the piezoelectric film 52) over the first electrode, and a second electrode (e.g., the second electrode 53) over the piezoelectric film. The first electrode has an outer shape (e.g., the width L1) that fits within an outer shape of the void space (e.g., the width L3) in the width direction. In other words, the piezoelectric element includes a first electrode over the vibration film in the lamination direction, a piezoelectric film over the first electrode in the lamination direction, and a second electrode over the piezoelectric film and the first electrode in the lamination direction. The first electrode has the outer ends within the opposed inner walls of the void space in the width direction.

Aspect 4

According to Aspect 4, in Aspect 3, the first electrode has the outer shape equal to or larger than an outer shape (e.g., the width L2) of the piezoelectric film. In other words, the piezoelectric film has a third width equal to or smaller than the second width of the first electrode.

Aspect 5

According to Aspect 5, in Aspect 3 or 4, the substrate includes a drive circuit (e.g., the drive circuit 101) to apply voltages to the first electrode and the second electrode.

Aspect 6

According to Aspect 6, in any one of Aspects 3 to 5, a piezoelectric layer (e.g., the piezoelectric layer 152) forming the piezoelectric film is made of a material that can be formed at a temperature of 450° C. or less. In other words, the piezoelectric film is made of a material that is film-formable at a temperature of 450° C. or less.

Aspect 7

According to Aspect 7, in any one of Aspects 3 to 6, the piezoelectric layer forming the piezoelectric film is formed by sputtering. In other words, the piezoelectric film is formed by sputtering.

Aspect 8

According to Aspect 8, in any one of Aspects 1 to 7, the void space is a liquid chamber (e.g., the liquid chamber 4) to store a liquid.

Aspect 9

According to Aspect 9, a liquid discharge head (e.g., the liquid discharge head 1, 1A, 1B, 1C, or 1D) includes an actuator having a liquid chamber to store a liquid; and a nozzle communicating with the liquid chamber. The actuator according to Aspect 8 (e.g., the actuators 110) is used as the actuator. In other words, a liquid discharge head includes the actuator according to Aspect 8 and a nozzle plate having a nozzle communicating with the liquid chamber.

Aspect 10

According to Aspect 10, in Aspect 9, multiple actuators (e.g., the actuators 110) are provided. The first electrode (e.g., the first electrode 51) and the second electrode (e.g., the second electrode 53) of each piezoelectric element (e.g., the piezoelectric element 5) are separated and electrically independent of each other, and voltages having different polarities are applied to the respective electrodes. In other words, the liquid discharge head according to Aspect 9 further includes multiple actuators including the actuator and a drive circuit to apply voltages to the piezoelectric element of each of the multiple actuators. The piezoelectric element includes a first electrode and a second electrode separated from the first electrode and electrically independent from the first electrode. The drive circuit applies the voltages having different polarities to the first electrode and the second electrode, respectively.

Aspect 11

According to Aspect 11, a liquid discharge apparatus (e.g., the printer 500) includes the liquid discharge head according to Aspect 9 or 10. Further, the liquid discharge apparatus includes a conveyor. The liquid discharge apparatus discharges the liquid to a recording medium, and the conveyor conveys the recording medium to a position facing the liquid discharge head.

Aspect 12

According to Aspect 12, a method of manufacturing an actuator includes forming a vibration film over a substrate in a lamination direction, forming a first electrode of a piezoelectric element over the vibration film in the lamination direction, forming a piezoelectric film of the piezoelectric element over the first electrode in the lamination direction, forming a second electrode of the piezoelectric element over the piezoelectric film in the lamination direction, and forming a void space in the substrate. The first electrode has a first width in a width direction perpendicular to the lamination direction. The void space has a second width larger than the first width in the width direction.

As described above, according to one aspect of the present disclosure, the drive efficiency of the actuator can be prevented from decreasing.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The invention claimed is:

1. An actuator comprising:

a substrate having a void space having a first width, defined by opposed inner walls, in a width direction;

a vibration film disposed over the substrate in a lamination direction perpendicular to the width direction, the vibration film serving as a part of a wall of the void space; and a piezoelectric element disposed over the vibration film in the lamination direction, the piezoelectric element opposed to the void space of the substrate via the vibration film, wherein the piezoelectric element has a second width smaller than the first width in the width direction, the piezoelectric element has outer ends, defining the second width, within the opposed inner walls of the void space in the width direction, the void space has a circular shape, having a first area, in a plane of the substrate, and the piezoelectric element has a circular shape, having a second area smaller than the first area, in the plane of the substrate.

2. The actuator according to claim 1, wherein the piezoelectric element includes:

a first electrode disposed over the vibration film in the lamination direction, the first electrode having the outer ends within the opposed inner walls of the void space in the width direction;

a piezoelectric film disposed over the first electrode in the lamination direction; and a second electrode disposed over the piezoelectric film and the first electrode in the lamination direction.

3. The actuator according to claim 2, wherein the first electrode has the second width in the width direction, and the piezoelectric film has a third width equal to or smaller than the second width of the first electrode.

4. The actuator according to claim 2, wherein the substrate includes a drive circuit configured to apply voltages to the first electrode and the second electrode.

5. The actuator according to claim 2, wherein the piezoelectric film is made of a material that is film-formable at a temperature of 450° C. or less.

6. The actuator according to claim 2, wherein the piezoelectric film is formed by sputtering.

7. The actuator according to claim 1, wherein the void space is a liquid chamber configured to store a liquid.

8. A liquid discharge head comprising:

the actuator according to claim 7; and a nozzle plate having a nozzle communicating with the liquid chamber.

9. The liquid discharge head according to claim 8, further comprising:

multiple actuators including the actuator; and a drive circuit configured to apply voltages to the piezoelectric element of each of the multiple actuators, wherein the piezoelectric element includes:

a first electrode; and a second electrode separated from the first electrode and electrically independent from the first electrode, and the drive circuit applies the voltages having different polarities to the first electrode and the second electrode, respectively.

10. A liquid discharge apparatus comprising:

the liquid discharge head according to claim 8, to discharge the liquid to a recording medium; and a conveyor configured to convey the recording medium to a position facing the liquid discharge head.

11. A method of manufacturing an actuator, the method comprising:

forming a vibration film over a substrate in a lamination direction;

forming a first electrode of a piezoelectric element over the vibration film in the lamination direction, the first electrode having a first width in a width direction perpendicular to the lamination direction;

forming a piezoelectric film of the piezoelectric element over the first electrode in the lamination direction;

forming a second electrode of the piezoelectric element over the piezoelectric film in the lamination direction; and forming a void space in the substrate, the void space having a second width larger than the first width in the width direction, wherein the void space has a circular shape, having a first area, in a plane of the substrate, and the piezoelectric element has a circular shape, having a second area smaller than the first area, in the plane of the substrate.

* * * * *